United States Patent
Shiu et al.

(10) Patent No.: US 6,983,166 B2
(45) Date of Patent: Jan. 3, 2006

(54) POWER CONTROL FOR A CHANNEL WITH MULTIPLE FORMATS IN A COMMUNICATION SYSTEM

(75) Inventors: Da-shan Shiu, San Jose, CA (US); Serge Willenegger, Onnens (CH); Richard Chi, Santa Clara, CA (US); Parvathanathan Subrahmanya, Sunnyvale, CA (US); Chih-Ping Hsu, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 597 days.

(21) Appl. No.: 09/933,604

(22) Filed: Aug. 20, 2001

(65) Prior Publication Data

US 2003/0036403 A1 Feb. 20, 2003

(51) Int. Cl.
*H04Q 7/20* (2006.01)
(52) U.S. Cl. .................. 455/522; 455/69; 455/127.1; 370/342
(58) Field of Classification Search ............... 455/522, 455/69, 68, 67.1, 67.2, 226.1, 127.1, 343.1; 370/320, 252, 348, 337, 342
See application file for complete search history.

(56) References Cited

U.S. PATENT DOCUMENTS

| | | | |
|---|---|---|---|
| 5,056,109 A | 10/1991 | Gilhousen et al. | |
| 5,265,119 A | 11/1993 | Gilhousen et al. | |
| 5,903,554 A | 5/1999 | Saints | |
| 6,097,972 A | 8/2000 | Saints et al. | |
| 6,654,922 B1 * | 11/2003 | Numminen et al. | 714/748 |
| 6,754,506 B2 * | 6/2004 | Chang et al. | 455/522 |
| 2002/0009061 A1 * | 1/2002 | Willenegger | 370/328 |
| 2002/0054578 A1 * | 5/2002 | Zhang et al. | 370/328 |
| 2002/0136192 A1 * | 9/2002 | Holma et al. | 370/347 |

* cited by examiner

Primary Examiner—Tilahun Gesesse

(74) Attorney, Agent, or Firm—Philip R. Wadsworth; Thien T. Nguyen

(57) ABSTRACT

Techniques to more efficiently control the transmit power for a data transmission that uses a number of formats (e.g., rates, transport formats). Different formats for a given data channel (e.g., transport channel) may require different target SNIRs to achieved a particular BLER. In one aspect, individual target BLER may be specified for each format of each data channel. In another aspect, various power control schemes are provided to achieve different target SNIRs for different formats. In a first power control scheme, multiple individual outer loops are maintained for multiple formats. For each format, its associated outer loop attempts to set the target SNIR such that the target BLER specified for that format is achieved. In a second power control scheme, multiple individual outer loops are maintained and the base station further applies different adjustments to the transmit power levels for different formats.

8 Claims, 14 Drawing Sheets

POWER CONTROL FOR A CHANNEL WITH MULTIPLE FORMATS IN A COMMUNICATION SYSTEM

BACKGROUND

1. Field

The present invention relates generally to data communication, and more specifically to techniques for controlling the transmit power of a data transmission that uses multiple formats (e.g., rates, transport formats) as supported by a communication system using power control (e.g., W-CDMA).

2. Background

In a wireless communication system, a user with a terminal (e.g., a cellular phone) communicates with another user via transmissions on the downlink and uplink through one or more base stations. The downlink (i.e., forward link) refers to transmission from the base station to the terminal, and the uplink (i.e., reverse link) refers to transmission from the terminal to the base station. The downlink and uplink are typically allocated different frequencies.

In a Code Division Multiple Access (CDMA) system, the total transmit power available for a base station is typically indicative of the total downlink capacity for that base station since data may be concurrently transmitted to a number of terminals over the same frequency band. A portion of the total available transmit power is allocated to each active terminal such that the aggregate transmit power for all active terminals is less than or equal to the total available transmit power.

To maximize the downlink capacity, a power control mechanism is typically used to minimize power consumption and interference while maintaining the desired level of performance. Conventionally, this power control mechanism is implemented with two power control loops. The first power control loop (often referred to as an "inner" power control loop, or simply, the inner loop) adjusts the transmit power to each terminal such that the signal quality of the transmission received at the terminal (e.g., as measured by a signal-to-noise-plus-interference ratio (SNIR)) is maintained at a particular target SNIR. This target SNIR is often referred to as the power control setpoint (or simply, the setpoint). The second power control loop (often referred to as an "outer" power control loop, or simply, the outer loop) adjusts the target SNIR such that the desired level of performance (e.g., as measured by a particular target block error rate (BLER), frame error rate (FER), or bit error rate (BER)) is maintained. By minimizing the amount of transmit power while maintaining the target BLER, increased system capacity and reduced delays in serving users can be achieved.

A W-CDMA system supports data transmission on one or more transport channels, and one or more transport formats may be used for each transport channel. Each transport format defines various processing parameters such as the transmission time interval (TTI) over which the transport format applies, the size of each transport block of data, the number of transport blocks within each TTI, the coding scheme to be used for the TTI, and so on. The use of multiple transport formats allows different types or rates of data to be transmitted over a single transport channel.

The W-CDMA standard currently permits one target BLER to be specified by the base station for each transport channel, regardless of the number of transport formats that may be selected for use for the transport channel. Each transport format may be associated with a different code block length, which may in turn require a different target SNIR to achieve the target BLER. (For W-CDMA, the code block length is determined by the transport block size, which is specified by the transport format.) In W-CDMA, one or more transport channels are multiplexed together in a single physical channel, whose transmit power is adjusted through power control. Using the conventional power control mechanism, the inner power control loop would adjust the target SNIR based on the received transport blocks to achieve the target BLER or better for each transport channel.

Since different transport formats may require different target SNIRs to achieve the target BLER, the average transmit power for the physical channel may fluctuate depending on the specific sequence of transport formats selected for use in the constituent transport channel(s) (i.e., the relative frequency of the transport formats and their ordering). And since the outer and inner loops take some amount of time to converge, each time the transport format is changed, a transient occurs until the loops converge on the target SNIR for the new transport format. During this transient time, the actual BLER may be much greater or less than the target BLER, which would then result in degraded performance and lower system capacity.

There is therefore a need in the art for an improved power control mechanism for a (e.g., W-CDMA) communication system capable of transmitting data on one or more transport channels using multiple transport formats.

SUMMARY

Aspects of the invention provide techniques to more efficiently control the transmit power for a data transmission over a power-controlled channel that includes one or many data channels, with each data channel being associated with one or more formats (e.g., rates, transport formats as defined in W-CDMA, and so on). As used herein, a data channel refers to any signaling path for information (e.g., traffic or control) for which there is one or more associated data integrity specifications on the information (e.g., BLER, FER, and/or BER specification). The invention recognizes that different formats for a given data channel (e.g., a transport channel in W-CDMA) may require different target SNIRs to achieved a particular BLER. Various schemes are provided herein to effectively treat these different formats as "individual" transmissions with their own performance requirements, while reducing the overall transmit power for the data transmission. For clarity, various aspects and embodiments are described specifically for W-CDMA whereby multiple transport formats may be defined for each transport channel, and one or more transport channels are multiplexed onto a physical channel. However, the techniques described herein may also be applied to other systems whereby multiple formats are defined for each data channel, and one or more data channels are multiplexed onto a single power-controlled channel.

In one aspect, a particular target BLER may be specified for each transport format of each transport channel used for a data transmission, instead of a single target BLER for all transport formats of each transport channel. If N transport formats are available for use for a given transport channel, then up to N target BLERs may be specified for the transport channel.

In another aspect, various power control schemes are provided to achieve different target SNIRs for different transport formats. These schemes may be used to achieve different target BLERs specified for different transport formats (i.e., different code block lengths), which typically require different target SNIRs. These schemes may also be used if a single target BLER is specified for all transport formats of a given transport channel, since different transport formats may require different target SNIRs to achieve the same target BLER.

In a first power control scheme for achieving different target SNIRs for different transport formats, multiple individual outer loops are maintained for multiple transport formats. For each transport format, its associated outer loop attempts to set the target SNIR such that the target BLER specified for that transport format is achieved. The multiple individual outer loops would then form an overall outer loop that operates in conjunction with the (common) inner loop to derive the proper power control commands for all transport formats.

In a second power control scheme for achieving different target SNIRs for different transport formats, multiple individual outer loops are maintained for multiple transport formats, and the base station further applies different adjustments to the transmit power levels for different transport formats. The base station has knowledge of the specific transport format(s) that will be used for an upcoming transmission time interval (TTI) and can also participate in the power control by adjusting the transmit power for the data transmission based on the actual transport format(s) selected for use.

In one embodiment of the second scheme, the base station is provided with a table of power offsets for the available transport formats, which can be computed based on the relative difference in the target SNIRs required for the transport formats to achieve their target BLERs. For each TTI, the base station selects one or more transport formats for use for the TTI, retrieves from the table the power offset for each selected transport format, and transmits at a power level determined in part by the power offset(s) for the selected transport format(s). The base station's (transport format dependent) power adjustment may be made only to the data portion of a transmitted frame while the transmit power level for the remaining portion of the transmitted frame can be maintained (i.e., not adjusted based on transport format).

In another embodiment of the second scheme, the terminal assists in the determination of the power offsets (which are updated via a third power control loop) and provides updates for the power offsets to the base station based on a particular update scheme (e.g., periodically, as necessary, upon fulfillment of one or more conditions, and so on).

The various aspects and embodiments of the invention may be applied to any communication system that uses multiple formats for a single power-controlled channel. Multiple formats or rates may be supported by the use of multiple transport formats in W-CDMA and by other mechanisms in other CDMA standards. The techniques described herein may also be applied to the uplink as well as the downlink.

The invention further provides methods, power control mechanisms, apparatus, and other elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
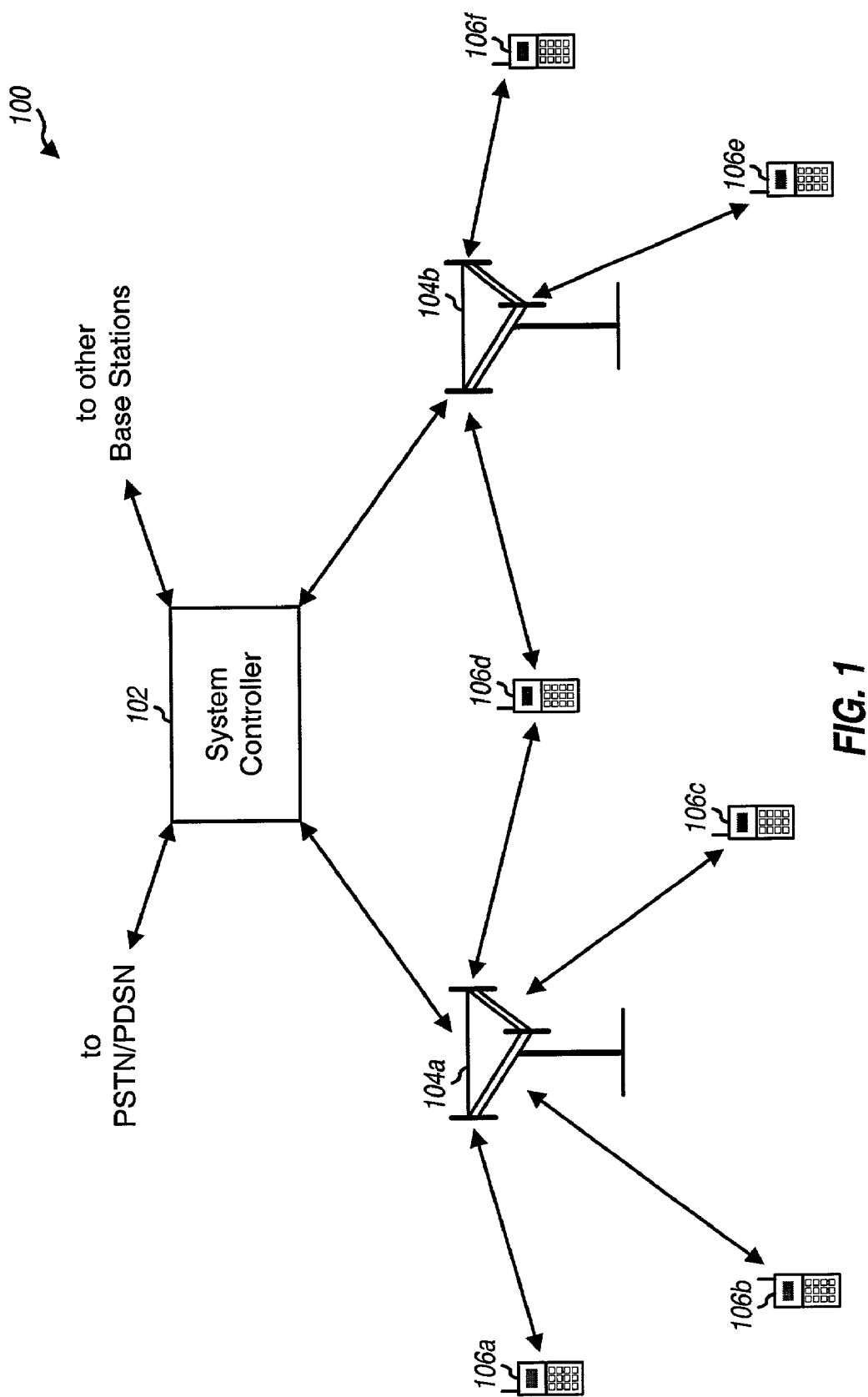
FIG. 1 is a diagram of a wireless communication system that supports a number of users and is capable of implementing various aspects and embodiments of the invention.

FIG. 1 is a diagram of a wireless communication system 100 that supports a number of users and is capable of implementing various aspects and embodiments of the invention. System 100 includes a number of base stations 104 that provide coverage for a number of geographic regions 102. A base station is also referred to as a base transceiver system (BTS) (in IS-95), an access point (in IS-856), or a Node B (in W-CDMA). The base station and/or its coverage area are also often referred to as a cell. System 100 may be designed to implement any combination of one or more CDMA standards such as IS-95, cdma2000, IS-856, W-CDMA, and other standards. These standards are known in the art and incorporated herein by reference.

As shown in FIG. 1, various terminals 106 are dispersed throughout the system. A terminal is also referred to as a mobile station, an access terminal (in IS-856), or a user equipment (UE) (in W-CDMA). In an embodiment, each terminal 106 may communicate with one or more base stations 104 on the downlink and uplink at any given moment, depending on whether or not the terminal is active and whether or not it is in soft handoff. As shown in FIG. 1, base station 104a communicates with terminals 106a, 106b, 106c, and 106d, and base station 104b communicates with terminals 106d, 106e, and 106f. Terminal 106d is in soft handoff and concurrently communicates with base stations 104a and 104b.

In system 100, a system controller 102 couples to base stations 104 and may further couple to a public switched telephone network (PSTN) and/or one or more packet data serving node (PDSN). System controller 102 provides coordination and control for the base stations coupled to it. System controller 102 further controls the routing of calls among terminals 106, and between terminals 106 and the PDSN or other users coupled to the PSTN (e.g., conventional telephones). System controller 102 is often referred to as a base station controller (BSC) or a radio network controller (RNC).

Figure 2A:
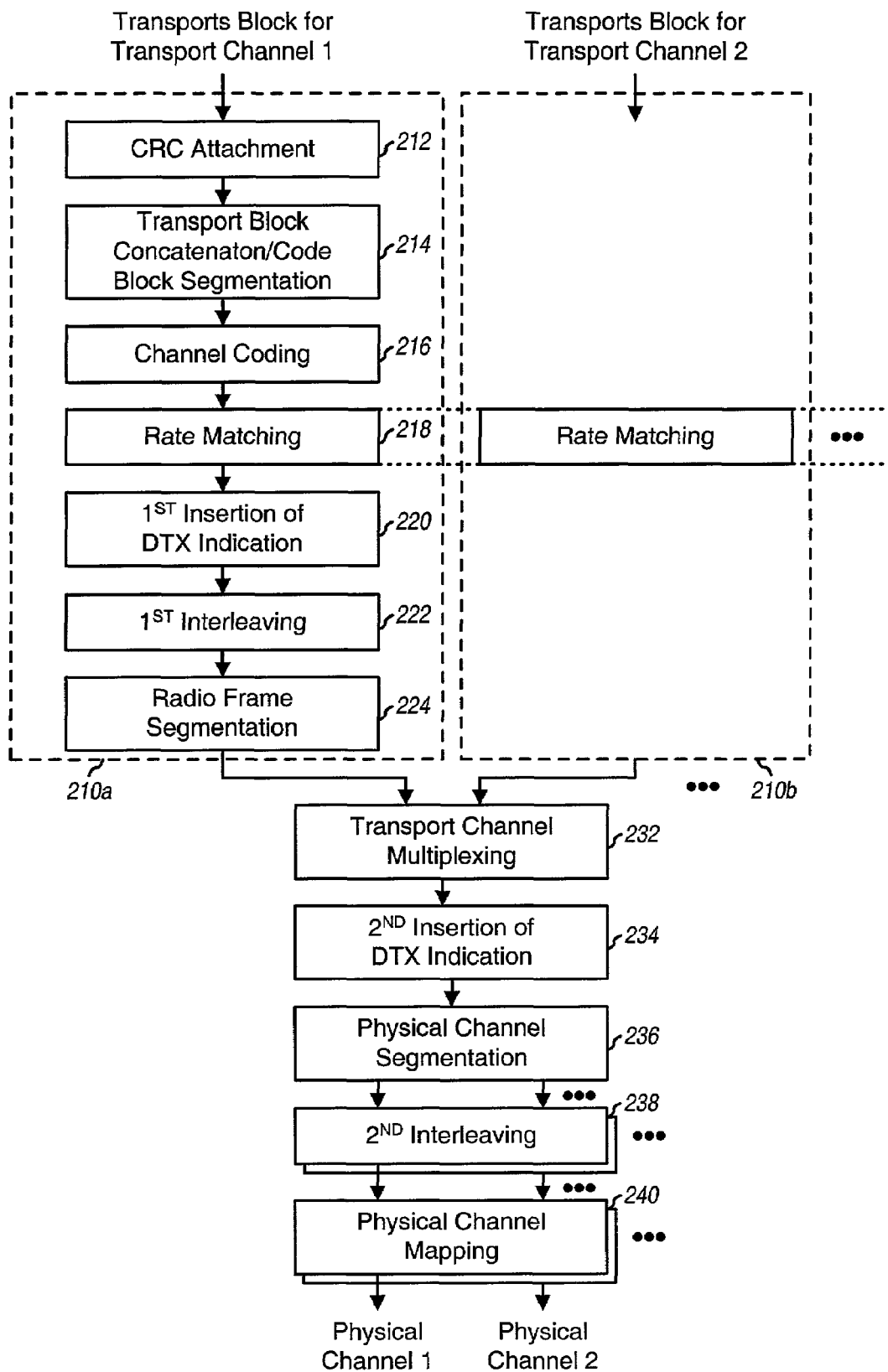
FIGS. 2A and 2B are diagrams of the signal processing at a base station and a terminal, respectively, for a downlink data transmission in accordance with the W-CDMA standard.

FIG. 2A is a diagram of the signal processing at a base station for a downlink data transmission, in accordance with the W-CDMA standard. The upper signaling layers of a W-CDMA system support data transmission on one or more transport channels to a specific terminal, with each transport channel being capable of carrying data for one or more services. These services may include voice, video, packet data, and so on, which are collectively referred to herein as "data".

The data for each transport channel is processed based on one or more transport formats selected for that transport channel. Each transport format defines various processing parameters such as a transmission time interval (TTI) over which the transport format applies, the size of each transport block of data, the number of transport blocks within each TTI, the coding scheme to be used for the TTI, and so on. The TTI may be specified as 10 msec, 20 msec, 40 msec, or 80 msec. Each TTI can be used to transmit a transport block set having $N_B$ equal-sized transport blocks, as specified by the transport format for the TTI. For each transport channel, the transport format can dynamically change from TTI to TTI, and the set of transport formats that may be used for the transport channel is referred to as the transport format set.

As shown in FIG. 2A, the data for each transport channel is provided, in one or more transport blocks for each TTI, to a respective transport channel processing section 210. Within each processing section 210, each transport block is used to calculate a set of cyclic redundancy check (CRC) bits, in block 212. The CRC bits are attached to the transport block and are used at the terminal for block error detection. The one or more CRC coded blocks for each TTI are then serially concatenated together, in block 214. If the total number of bits after concatenation is greater than the maximum size of a code block, then the bits are segmented into a number of (equal-sized) code blocks. The maximum code block size is determined by the particular coding scheme (e.g., convolutional, Turbo, or no coding) selected for use for the current TTI, which is specified by the transport format. Each code block is then coded with the selected coding scheme or not coded at all, in block 216, to generate coded bits.

Rate matching is then performed on the coded bits in accordance with a rate-matching attribute assigned by higher signaling layers and specified by the transport format, in block 218. On the uplink, bits are repeated or punctured (i.e., deleted) such that the number of bits to be transmitted matches the number of available bit positions. On the downlink, unused bit positions are filled with discontinuous transmission (DTX) bits, in block 220. The DTX bits indicate when a transmission should be turned off and are not actually transmitted.

The rate-matched bits for each TTI are then interleaved in accordance with a particular interleaving scheme to provide time diversity, in block 222. In accordance with the W-CDMA standard, the interleaving is performed over the TTI, which can be selected as 10 msec, 20 msec, 40 msec, or 80 msec. When the selected TTI is longer than 10 msec, the bits within the TTI are segmented and mapped onto consecutive transport channel frames, in block 224. Each transport channel frame corresponds to the portion of the TTI that is to be transmitted over a (10 msec) physical channel radio frame period (or simply, a "frame").

In W-CDMA, data to be transmitted to a particular terminal is processed as one or more transport channels at a higher signaling layer. The transport channels are then mapped to one or more physical channels assigned to the terminal for a communication (e.g., a call). In W-CDMA, a downlink dedicated physical channel (downlink DPCH) is typically assigned to each terminal for the duration of a communication. The downlink DPCH is used to carry the transport channel data in a time-division multiplexed manner along with control data (e.g., pilot, power control information, and so on). The downlink DPCH may thus be viewed as a multiplex of a downlink dedicated physical data channel (DPDCH) and a downlink dedicated physical control channel (DPCCH), as described below. The transport channel data is mapped only to the DPDCH, while the DPCCH includes the physical layer signaling information.

The transport channel frames from all active transport channel processing sections 210 are serially multiplexed into a coded composite transport channel (CCTrCH), in block 232. DTX bits may then be inserted into the multiplexed radio frames such that the number of bits to be transmitted matches the number of available bit positions on one or more "physical channels" to be used for the data transmission, in block 234. If more than one physical channel is used, then the bits are segmented among the physical channels, in block 236. The bits in each frame for each physical channel are then further interleaved to provide additional time diversity, at block 238. The interleaved bits are then mapped to the data portions of their respective physical channels, at block 240. The subsequent signal processing to generate a modulated signal suitable for transmission from the base station to the terminal is known in the art and not described herein.

Figure 2B:
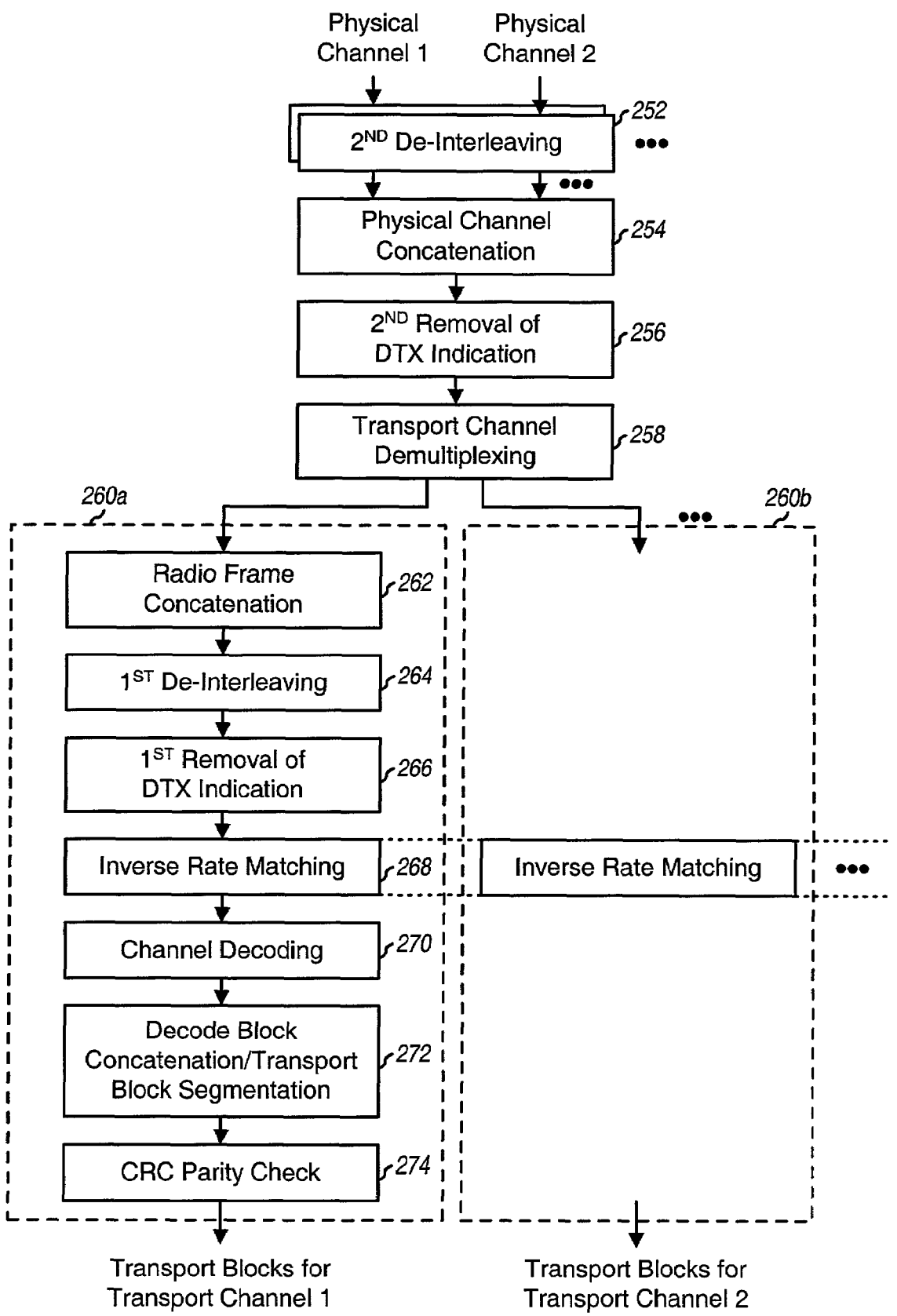

FIG. 2B is a diagram of the signal processing at a terminal for the downlink data transmission, in accordance with the W-CDMA standard. The signal processing shown in FIG. 2B is complementary to that shown in FIG. 2A. Initially, the modulated signal is received, conditioned, digitized, and processed to provide symbols for each physical channel used for the data transmission. Each symbol has a particular resolution (e.g., 4-bit) and corresponds to a transmitted bit. The symbols in each frame for each physical channel are de-interleaved, in block 252, and the de-interleaved symbols from all physical channels are concatenated, in block 254. The symbols are then demultiplexed into various transport channels, in block 258. The radio frames for each transport channel are then provided to a respective transport channel processing section 260.

Within each transport channel processing section 260, the transport channel radio frames are concatenated into transport block sets, in block 262. Each transport block set includes one or more transport channel radio frames a respective TTI. The symbols within each transport block set are de-interleaved, in block 264, and non-transmitted symbols are removed, in block 266. Inverse rate matching (or de-rate matching) is then performed to accumulate repeated symbols and insert "erasures" for punctured symbols, in block 268. Each coded block in the transport block set is then decoded, in block 270, and the decoded blocks are concatenated and segmented into one or more transport blocks, in block 272. Each transport block is then checked for error using the CRC bits attached to the transport block, in block 274. For each transport channel, one or more decoded transport blocks are provided for each TTI.

Figure 3A:
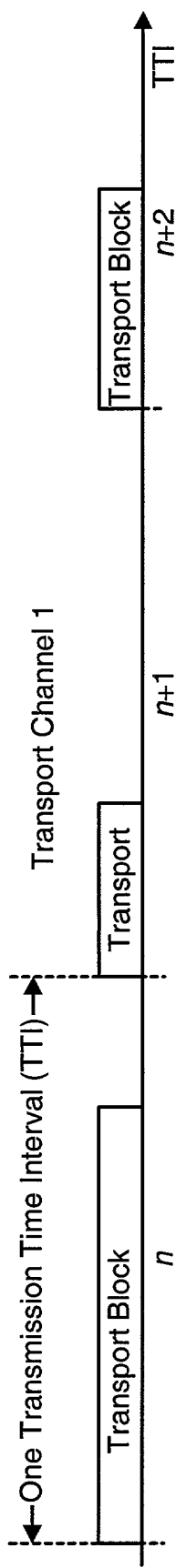
FIGS. 3A and 3B illustrate two different transport formats that may be used for two different transport channels.
Figure 3B:
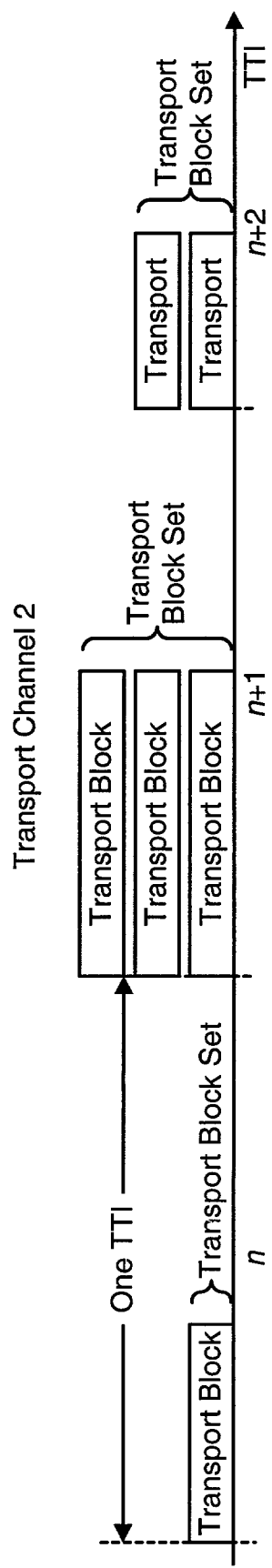

FIGS. 3A and 3B illustrate two different transport formats that may be used for two different transport channels. As noted above, each transport channel may be associated with a respective transport format set, which includes one or more transport formats available for use for the transport channel. Each transport format defines, among other parameters, the size of the transport block and the number of transport blocks in a TTI.

FIG. 3A illustrates a transport format set whereby one transport block is transmitted for each TTI, with the transport blocks for different transport formats having different sizes. This transport format set may be used, for example, for voice service whereby an adaptive multi-rate (AMR) speech coder may be used to provide a full rate (FR) frame, a silence descriptor (SID) frame, or a no-data (NULL or DTX) frame every 20 msec depending on the speech contents. The TTI can then be selected as 20 msec. FR frames are provided during periods of active speech, and a SID frame is typically sent once every 160 msec during periods of silence (i.e., pauses). In general, shorter transport blocks may be sent when there is no (or less) voice activity and longer transport blocks may be sent when there is (more) voice activity. The NULL frame is sent during periods of silence when SID is not sent.

FIG. 3B illustrates a transport format set whereby one or more transport blocks are transmitted for each TTI, with the transport blocks for different transport formats having different sizes. This transport format set may be used, for example, to support multiple services on a given transport channel. For example, a non-realtime service (e.g., packet data) may be multiplexed with a realtime service (e.g., voice). In this case, additional transport blocks may be used to support the non-realtime service when and as needed.

The W-CDMA standard defines a channel structure capable of supporting a number of users and designed for efficient transmission of various types of data. As noted above, in accordance with the W-CDMA standard, data to be transmitted to each terminal is processed as one or more transport channels at a higher signaling layer, and the transport channel data is then mapped to one or more physical channels assigned to the terminal. The transport channels support concurrent transmission of different types of services (e.g., voice, video, packet data, and so on) for a number of users.

In the W-CDMA system, a downlink DPCH is typically assigned to each terminal for the duration of a communication. The downlink DPCH is used to carry one or more transport channels and is characterized by the possibility of fast data rate change (e.g., every 10 msec), fast power control, and inherent addressing to a specific terminal. The downlink DPCH is used to transmit user-specific data in a time-division multiplexed manner along with control data.

Figure 4:
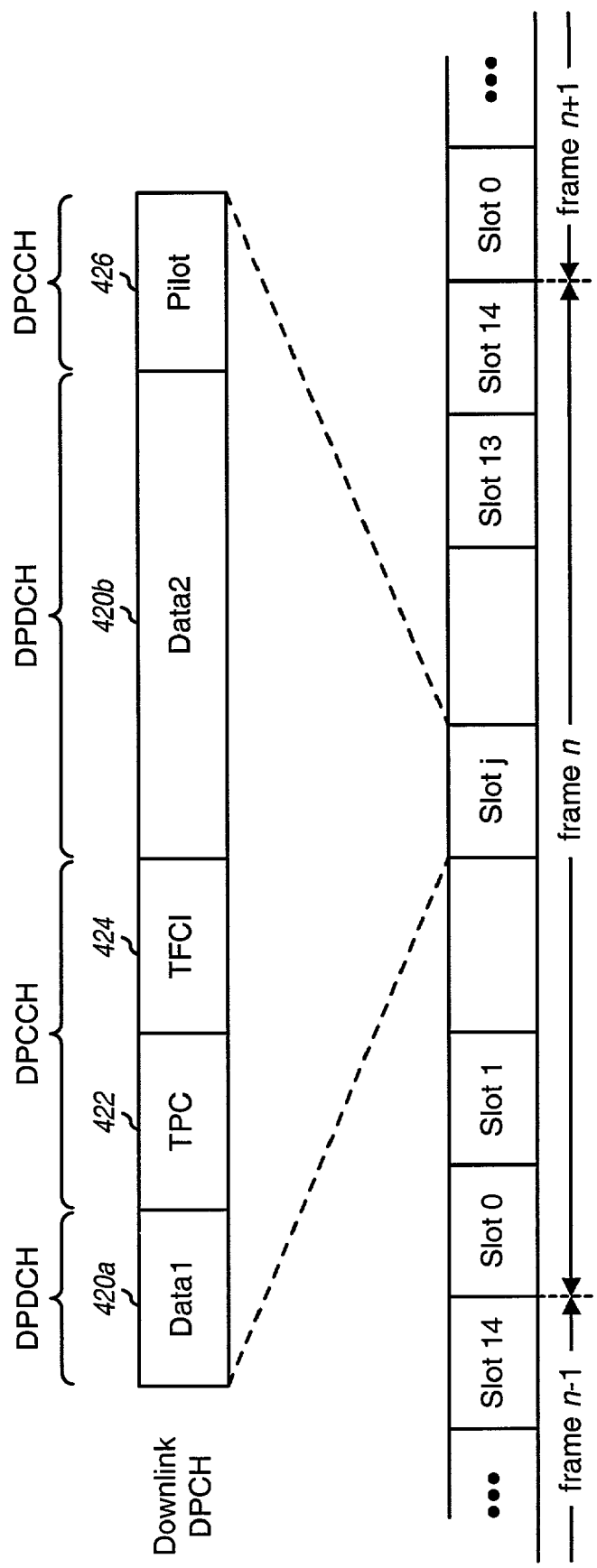
FIG. 4 is a diagram of a frame format and a slot format for a downlink DPCH defined by the W-CDMA standard.

FIG. 4 is a diagram of a frame format and a slot format for the downlink DPCH, as defined by the W-CDMA standard. The data to be transmitted on the downlink DPCH is partitioned into radio frames, with each radio frame being transmitted over a (10 msec) frame that comprises 15 slots labeled as slot 0 through slot 14. Each slot is further partitioned into a number of fields used to carry user-specific data, signaling, and pilot, or a combination thereof.

As shown in FIG. 4, for the downlink DPCH, each slot includes data fields 420a and 420b (Data 1 and Data 2), a transmit power control (TPC) field 422, a transport format combination indicator (TFCI) field 424, and a pilot field 426. Data fields 420a and 420b are used to send user-specific data. TPC field 422 is used to send power control information to direct the terminal to adjust its uplink transmit power either up or down to achieve the desired uplink performance while minimizing interference to other terminals. TFCI field 424 is used to send information indicative of the transport format of the downlink DPCH and a downlink shared channel DSCH, if any, assigned to the terminal. And pilot field 426 is used to send a dedicated pilot for the downlink.

On the downlink, the capacity of each base station is limited by its total available transmit power. To provide the desired level of performance and maximize system capacity, the transmit power of each data transmission from the base station is typically controlled to be as low as possible to reduce power consumption and interference while maintaining the desired level of performance (e.g., a particular target BLER, FER, or BER). If the received signal quality as measured by the received signal-to-noise-plus-interference ratio (SNIR) at the terminal is too poor, then the likelihood of correctly decoding the data transmission decreases and performance may be compromised (higher BLER). Conversely, if the received signal quality is too high, then the transmit power level is likely to be too high and excessive amount of transmit power may have been unnecessarily used for the data transmission, which would then reduce system capacity and may further cause extra interference to the transmissions from other base stations.

Figure 5:
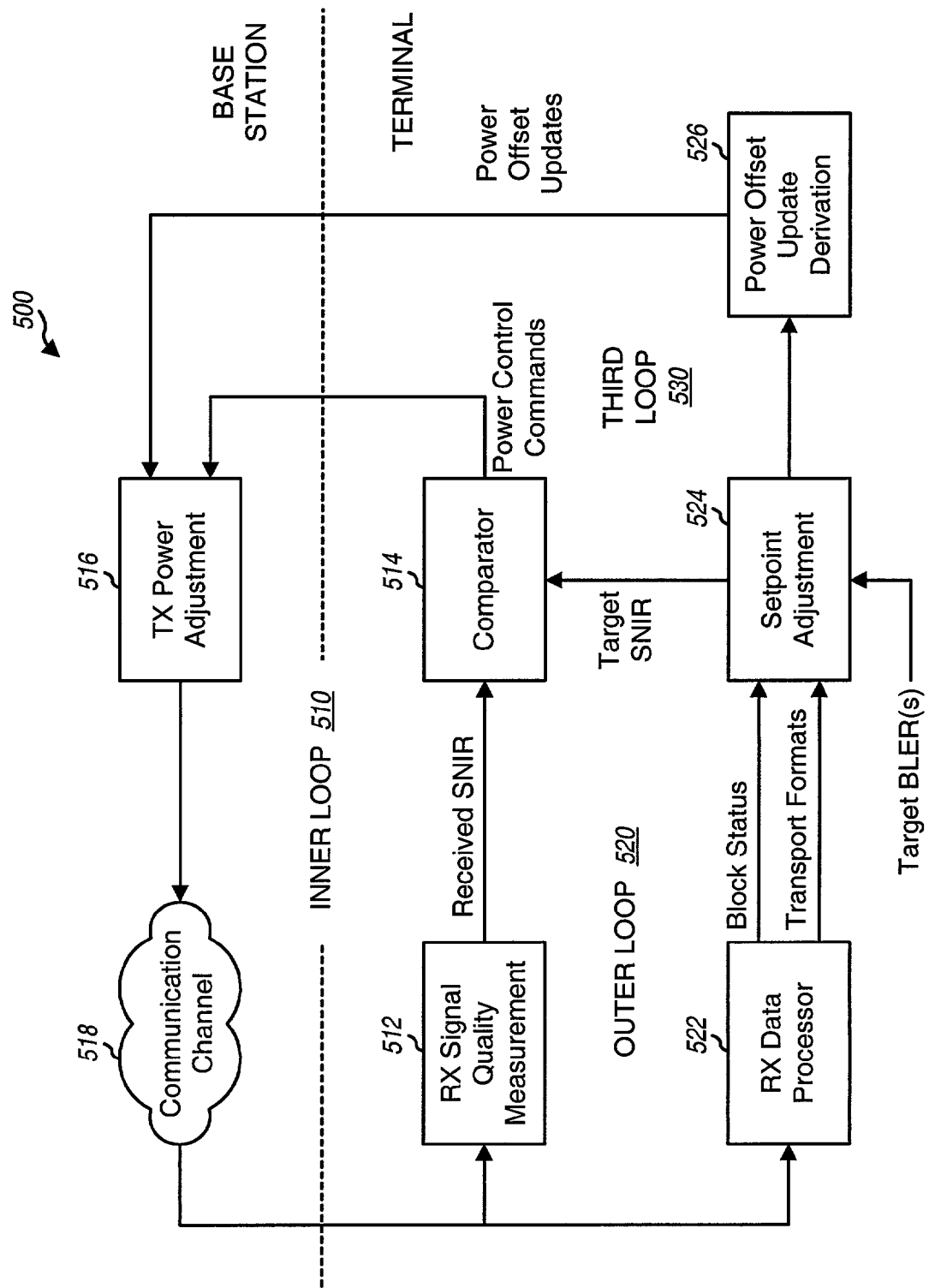
FIG. 5 is a diagram of a downlink power control mechanism capable of implementing various aspects and embodiments of the invention.

FIG. 5 is a diagram of a downlink power control mechanism 500 capable of implementing various aspects and embodiments of the invention. Power control mechanism 500 includes an inner power control loop 510 that operates in conjunction with an outer power control loop 520.

Inner loop 510 is a (relatively) fast loop that attempts to maintain the signal quality of a data transmission received at the terminal as close as possible to a target SNIR (i.e., a setpoint). As shown in FIG. 5, inner loop 510 operates between the base station and the terminal, and one inner loop is typically maintained for each data transmission to be independently power-controlled.

The inner loop adjustment for a particular data transmission is typically achieved by (1) measuring the signal quality of the data transmission at the terminal (block 512), (2) comparing the received signal quality (i.e., the received SNIR) against the target SNIR (block 514), and (3) sending power control information back to the transmitting base station. The signal quality measurement is typically made on a pilot included in the data transmission. The power control information may be used by the base station to adjust its transmit power for the data transmission, and may be in the form of an "UP" command to request an increase in the transmit power or a "DOWN" command to request a decrease in the transmit power. The base station may adjust the transmit power for the data transmission accordingly (block 516) each time it receives the power control information. For the W-CDMA system, the power control information may be sent as often as 1500 times per second (i.e., one power control command for each slot), thus providing a relatively fast response time for inner loop 510.

Due to path loss, fading, and possibly other phenomena in the communication channel (cloud 518), which typically varies over time, especially for a mobile terminal, the received SNIR at the terminal continually fluctuates. Inner loop 510 attempts to maintain the received SNIR at or near the target SNIR in the presence of changes in the communication channel.

Outer loop 520 is a (relatively) slower loop that continually adjusts the target SNIR such that the desired level of performance is achieved for the data transmission to the terminal. The desired level of performance is typically specified as a particular target BLER, although some other performance criterion may also be used to adjust the target SNIR. The target SNIR necessary to maintain a particular target BLER may change depending on the conditions of the communication channel. For example, a fast fading channel may have a different SNIR target than a slow fading channel to maintain the same BLER.

The outer loop adjustment for the SNIR target is typically achieved by (1) receiving and processing the data transmission to recover transmitted data blocks (or transport blocks), (2) determining the status of each received transport block (block 522) as being decoded correctly (good) or in error (erased), and (3) adjusting the target SNIR (block 524) based on the transport block status (and possibly along with other information, as described below). If a transport block is decoded correctly, then the received SNIR at the terminal is likely to be higher than necessary and the target SNIR may be reduced slightly. Alternatively, if a transport block is decoded in error, then the received SNIR at the terminal is likely to be lower than necessary and the target SNIR may be increased. In either scenario, inner loop 510 will try to keep the received SNIR at the target SNIR provided by the outer loop.

By controlling the manner in which the target SNIR is adjusted, different power control characteristics and performance level may be obtained. For example, the target BLER may be adjusted by selecting the proper amount of upward adjustment ($\Delta$UP) in the target SNIR for a bad block, the amount of downward adjustment ($\Delta$DN) for a good block, the required elapsed time between successive increases in the target SNIR, and so on. The target BLER (i.e., the long-term BLER) may be set as $\Delta$DN/($\Delta$DN+$\Delta$UP). The magnitudes of $\Delta$UP and $\Delta$DN also determine the responsiveness of the power control mechanism to sudden changes in the communication channel.

For the W-CDMA system, the terminal can estimate the received SNIR of the transmission on the downlink DPCH (or more specifically, the pilot on the DPCCH). The terminal then compares the received SNIR to the target SNIR and generates transmit power control (TPC) commands to increase (or decrease) the transmit power if the received SNIR is less than (or greater than) the target SNIR. In response to receiving the TCP commands, the base station may adjust the transmit power of the downlink DPCH.

In the W-CDMA system, for any given transport channel, the base station can specify to the terminal a particular target BLER. For data integrity, the actual BLER should not exceed the target BLER. At the same time, the actual BLER should not consistently fall below the target BLER, since that would imply excess transmit power is used for the data transmission, which would then reduce the capacity of the transmitting base station and may further cause unnecessary interference to neighboring cells.

The terminal and base station attempt to achieve and maintain the target BLER specified for the transport channel through the power control mechanism described above. For a transport channel with only one transport format (i.e., transport blocks of equal sizes, which translates into code blocks of uniform lengths), a steady state condition in the power control is reached when the outer and inner loops converge on the target SNIR required (under the given channel conditions) to provide the target BLER for the (one) transport format used for the transport channel. A power control mechanism that maintains one individual outer loop for each transport channel is described in U.S. Pat. No. 6,748,234, entitled "METHOD AND APPARATUS FOR POWER CONTROL IN A WIRELESS COMMUNICATION SYSTEM," issued Jun. 8, 2004, assigned to the assignee of the present application and incorporated herein by reference.

However, in W-CDMA, data may be transmitted on a given transport channel using many possible transport formats. For example, on a transport channel for a voice call, shorter transport blocks may be sent when there is no voice activity and longer transport blocks may be sent when there is voice activity. The SNIR required to achieve the target BLER may be very different for code blocks of different lengths, and thus the required SNIRs may be different for different transport formats.

The W-CDMA standard currently allows one target BLER to be specified for each transport channel regardless of the number of transport formats that may be used for this transport channel. Since different transport formats may require different target SNIRs to meet the target BLER as described above, this W-CDMA specification is not precise. The average transmit power will likely fluctuate depending on the relative frequency and/or order of succession of the transport formats used for the transport channel.

If the outer loop converges on the target SNIR for a particular transport format, and if the transport format is then changed, a transient time is typically required for the outer loop to converge again to the new target SNIR for the new transport format. During this transient time, the actual BLER may be much greater or less than the target BLER. For a data transmission that uses a mix of transport formats, the duty cycle as well as the period of the duty cycle of the transport formats may determine different values for the required target SNIRs. For example, the outer loop will likely converge on different sets of required SNIRs for the case of 10 TTIs of transport format 1, TF(1), alternating with 10 TTIs of TF(2), versus 20 TTIs of TF(1) alternating with 10 TTIs of TF(2), and so on. It is likely that the target BLER will not be met with the most efficient transmit power, if at all, for all transport formats if a conventional power control mechanism is used.

Moreover, when many transport formats are used for a given transport channel, the target BLER may not need to be the same for all transport formats. For example, for a voice call, transport formats known to have insignificant voice content (e.g., background noise) may be able to tolerate higher BLERs than transport formats with voice content.

Aspects of the invention provide various techniques to more effectively and efficiently control the transmit power for a data transmission that uses a number of transport formats. The invention recognizes that different transport formats for a given transport channel may require different target SNIRs to achieve a particular BLER. Various schemes are provided herein to effectively treat these different transport formats as "individual" transmissions with their own performance requirements while reducing the overall transmit power for the data transmission.

In one aspect of the invention, a particular target BLER may be specified for each transport format of each transport channel used for a data transmission, instead of a single target BLER for all transport formats of each transport channel. If N transport formats are available for use for a given transport channel, then up to N target BLERs may be specified for the transport channel.

For each transport format TF(i) of a particular transport channel TrCH(k), $SNIR_{TCk,TFi}$ is the SNIR required for a received BLER of $BLER_{TCk,TFi}$, which is the target BLER for the transport format. If N transport formats are available for use, then target $SNIR_{TCk,TF1}$ through $SNIR_{TCk,TFN}$ are required to respectively achieve target $BLER_{TCk,TF1}$ through $BLER_{TCk,TFN}$ for transport formats TF(1) through TF(N). The power control mechanism can then be operated such that the proper set of target BLER and SNIR is used for each received transport format, and to provide the proper power control commands based on this set of target BLER and SNIR. Some power control mechanisms capable of achieving this are described in further detail below.

Specifying multiple individual target BLERs for each transport channel is more efficient since different types of data may have different performance requirements. Certain data may be more critical and would require a lower target BLER. Conversely, certain other data may be less critical and can tolerate a higher target BLER. At the extreme, a "don't care" target BLER may be specified for any transport format for which the BLER does not matter, in which case the power control mechanism may be temporarily de-activated when these transport formats are used. The "don't care" target BLER may be explicitly specified (e.g., sent over the air) or implicitly specified (e.g., by not specifying any value), and may be used, for example, for NULL/DTX transport blocks.

Multiple individual target BLERs for each transport channel allow for a specification of the target BLER that is both efficient and independent of the selected transport format combination, their relative frequency of occurrence, and their order of succession. The current W-CDMA standard may be amended to support the specification of multiple target BLERs for multiple transport formats for each transport channel.

In another aspect of the invention, various power control schemes are provided to achieve different target SNIRs for different transport formats. These schemes may be used to achieve different target BLERs specified for different transport formats, which generally require different target SNIRs. These schemes may also be used even if a single target BLER is specified for all transport formats of a given transport channel, as in the current W-CDMA standard, since different transport formats may require different target SNIRs to achieve the same target BLER. Some of these power control schemes are described below, and others may also be implemented and are within the scope of the invention.

In a first power control scheme for achieving different target SNIRs for different transport formats, multiple individual outer loops are maintained for multiple transport formats. For each transport format, its associated outer loop attempts to set the target SNIR such that the target BLER specified for that transport format is achieved. The multiple individual outer loops would then form an overall outer loop that operates in conjunction with the (common) inner loop to derive the proper power control commands for all transport formats. Various embodiments of this power control scheme can be designed, some of which are described below.

Figure 6:
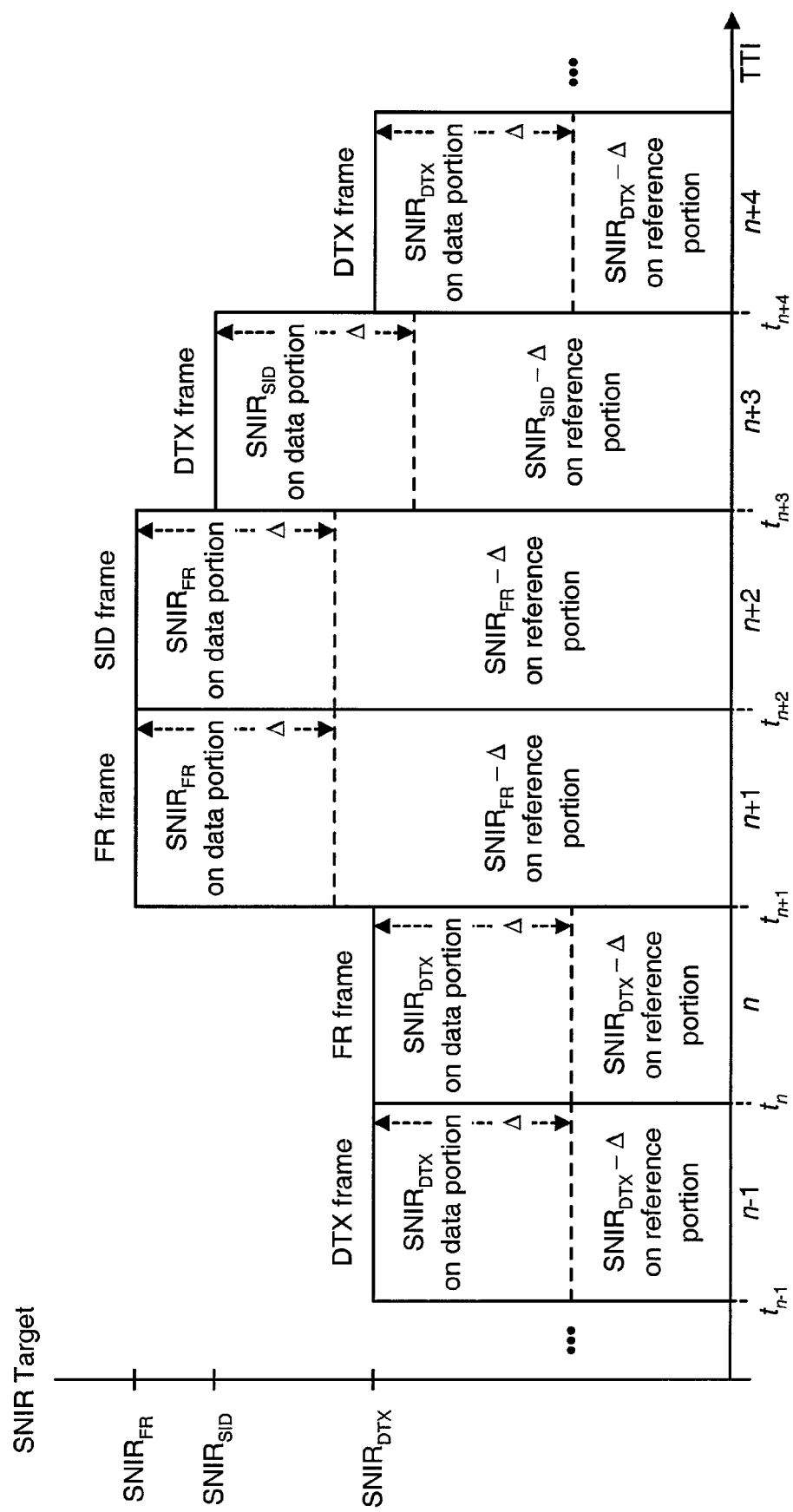
FIG. 6 illustrates a first power control scheme whereby multiple individual outer loops are maintained to control the transmit power of a data transmission that uses multiple transport formats.

FIG. 6 illustrates a specific embodiment of the first power control scheme whereby multiple individual outer loops are maintained to control the transmit power of a data transmission that uses multiple transport formats. In FIG. 6, the horizontal axis denotes time, which is provided in units of TTI. The vertical axis denotes the SNIR target that is used by the inner loop power control at the terminal.

Prior to time $t_n$, a number of DTX frames have been sent by the base station with the data portion transmitted at a power level of $\Delta$ over the power level of a "reference" portion of the frame (e.g., the pilot portion of the DPCCH shown in FIG. 4). This power offset $\Delta$ is typically not known to the terminal. The inner and outer loops typically operate on the reference portion of the frame, and the transmit power of the data portion is adjusted by controlling the transmit power of the reference portion (i.e., the transmit power levels of the data and reference portions are ganged by $\Delta$). The outer loop has settled on the target $SNIR_{DTX}$ required on the data portion to achieve the target $BLER_{DTX}$ for DTX frames. The corresponding target SNIR for the reference portion, $SNIR_{ref}$, provided by the outer loop to the inner loop for TTI(n) is thus $SNIR_{ref}(n) = SNIR_{DTX} - \Delta$.

At time $t_n$, the base station switches to a new transport format, and a full rate (FR) frame is transmitted during TTI(n), with the data portion of the frame again being transmitted at a power level of $\Delta$ over the reference portion of the frame. During the entire TTI(n), the terminal uses the reference portion target $SNIR_{ref}(n)$ for the inner loop. This reference portion target $SNIR_{ref}(n)$ was derived by the outer loop from the received frame in TTI(n−1), which was of frame type DTX, since it has not determined that the transport format in TTI(n) has changed. For W-CDMA, 15 power control commands are sent for each 10 msec frame, and each TTI may have a duration of 1, 2, 4, or 8 frames.

In the specific embodiment shown in FIG. 6, the terminal is not provided with the transport format information a priori, and detects the transport format only after the entire FR frame has been received and processed. In accordance with W-CDMA, the TFCI is sent every 10 msec, and the terminal may thus be able to detect the transport format after receiving the first 10 msec of the frame (e.g., after the first half of a 20-msec AMR (FR, SID, or DTX) frame). If the transport format can be detected before an entire frame is received (e.g., after only half of a DTX/SID/FR frame), then only a portion of the frame may be received at the wrong target SNIR and the remaining portion of the frame may be received at the proper target SNIR. For simplicity, various aspects and embodiments of the invention are described for the case wherein the entire frame needs to be received before the transport format can be ascertained. However, the techniques described herein may also be applied in cases where the transport format can be determined prior to receiving the entire frame (e.g., by decoding the TFCI right after the first 10 msec.

For the embodiment shown in FIG. 6, the SNIR on the reference portion of TTI(n) will be driven to $SNIR_{ref}(n+1) = SNIR_{DTX} - \Delta$, and the data portion will be at $SNIR_{DTX}$. This SNIR is less than the required $SNIR_{FR}$ on the data portion of the FR frame to achieve $BLER_{FR}$. The first FR frame during TTI(n) will thus likely be received in error because of the low received SNIR (i.e., for the FR frame) achieved using the target $SNIR_{DTX}$ during TTI(n).

Shortly after time $t_{n+1}$, the terminal determines that the FR transport format was used for TTI(n), and accordingly updates the reference portion target $SNIR_{ref}(n+1)$ for the inner loop from the old target ($SNIR_{DTX} - \Delta$) to the new target ($SNIR_{FR} - \Delta$). This reference portion target $SNIR_{ref}(n+1)$ is then used for the inner loop during the reception of the frame in TTI(n+1). The terminal also updates the target $SNIR_{FR}$ for FR frames based on the status of the received FR frame (e.g., good or erased) to achieve the target $BLER_{FR}$ for FR frames. During TTI(n+1), another FR frame is transmitted and the terminal (correctly) uses the reference portion target $SNIR_{ref}(n+1)$ for the inner loop.

At time $t_{n+2}$, the base station switches to a new transport format, and a SID frame is transmitted during TTI(n+2) at a power level of $\Delta$ over the reference power level. During the entire TTI(n+2), the terminal uses the reference portion target $SNIR_{ref}(n+2) = SNIR_{FR} - \Delta$ for the reference portion of the SID frames for the inner loop since it has not determined that the transport format in TTI(n+2) has changed. Shortly after time $t_{n+3}$, the terminal determines that the transport format for the previous TTI(n+2) has changed, and switches to the outer loop for SID frames. The reference portion target $SNIR_{ref}(n+3)=SNIR_{SID}-\Delta$ is then used to drive the inner loop from this point forward, until another outer loop is selected. The terminal also updates the target $SNIR_{SID}$ for SID frames based on the status of the received SID frame to achieve the target $BLER_{SID}$ for SID frames.

At time $t_{n+3}$, the base station switches to the DTX transport format, and a DTX frame is transmitted during TTI(n+3). During the entire TTI(n+3), the terminal uses the reference portion target $SNIR_{ref}(n+3)=SNIR_{SID}-\Delta$ for the inner loop since it has not determined that the transport format in TTI(n+3) has changed. Shortly after time $t_{n+4}$, the terminal determines that the transport format for the previous TTI(n+3) has changed, and switches to the outer loop for DTX frames. The reference portion target $SNIR_{ref}(n+4)=SNIR_{DTX}-\Delta$ is then used to drive the inner loop from this point forward, until another outer loop is selected. The terminal also updates the target $SNIR_{DTX}$ for DTX frames based on the status of the received DTX frame to achieve the target $BLER_{DTX}$.

In the first embodiment of the first power control scheme, as shown in FIG. 6, the transport format for the current TTI is not known a priori, and the terminal uses the target SNIR for the transport format received in the immediately prior TTI for the inner loop.

If the terminal is provided with information indicative of the specific transport format being used for the current TTI before having to receive the whole frame, then it can apply the proper outer loop and use the proper target SNIR for the inner loop during the TTI. This transport format information may be provided to the terminal via various mechanisms such as, for example, a predetermined schedule, a preamble at the start of each transmitted frame, signaling on another transport channel, and so on.

If the terminal is not provided with the transport format information a priori, then some delays exist in this power control scheme. The amount of delay is determined by the amount of time required to process a received frame to ascertain the transport format used for the received frame. If an entire transmitted frame needs to be received and processed before the transport format can be ascertained, then a one-frame delay (or possibly more) exists between the time a new transport format is used for data transmission at the base station and the time the proper target SNIR is used for power control at the terminal.

To reduce adverse effects due to delays caused by late detection of the transport format, the transport format for the current TTI may be predicted. This prediction may be made based on any available knowledge for the data transmission. In this case, the target SNIR of the predicted transport format (and not the maximum target SNIR) may be used for the inner loop, which may improve efficiency and performance.

In a second embodiment of the first power control scheme, to ensure that sufficient transmit power is used at any given time for all transport formats that may be used in a particular TTI (i.e., "possible" transport formats), the target SNIR for all possible transport formats are compared, and the maximum target SNIR is selected for use. If only a subset of all available transport formats may be used in a particular TTI, then the maximum can be taken over the subset of possible transport formats and not the total set of all available transport formats.

As noted above, if a delay exists in the power control mechanism due to "late" detection of the transport format, then an inappropriate target SNIR may be used during the delay period when the transport format is not known. The second embodiment thus ensures that sufficient transmit power will be used regardless of the transport format selected. One or more of the target SNIRs may be updated at the end of each TTI based on the status of the received transport blocks, the transport format used for the TTI, and so on, as described below.

Figure 7:
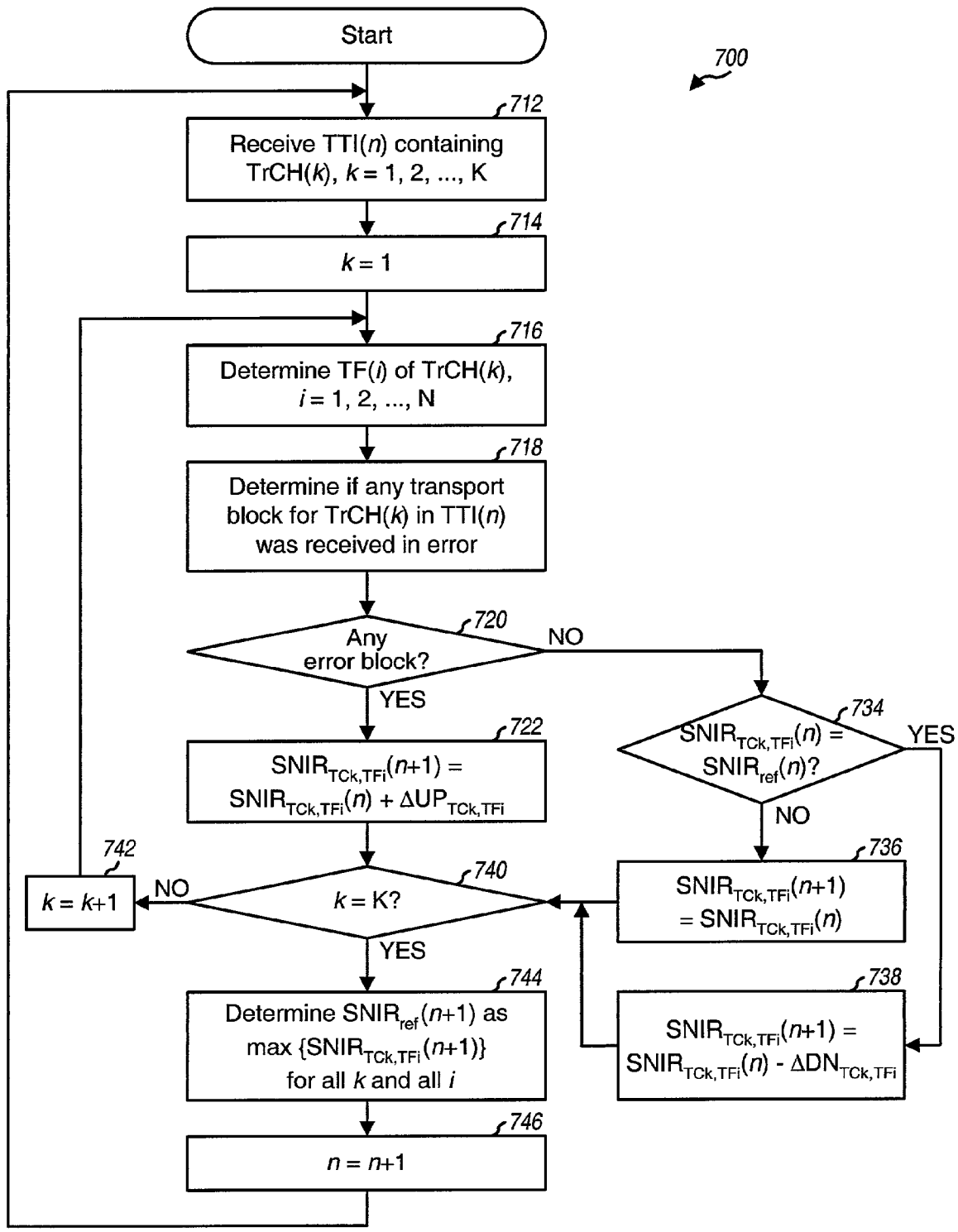
FIG. 7 is a flow diagram of an embodiment of a process performed at the terminal to maintain a number of individual outer loops for a number of transport formats based on the first power control scheme.

FIG. 7 is a flow diagram of an embodiment of a process 700 performed at the terminal to maintain a number of individual outer power control loops for a number of transport formats. Initially, the outer loop targets, $SNIR_{TCk,TFi}(n)$, for all transport channels and all transport formats are set to some particular (e.g., arbitrary) initial value. The corresponding overall target SNIR, $SNIR_{ref}(n)$, is also set at the same value. The terminal receives data for K transport channels (i.e., TrCH(k) where k=1, 2, . . . K, and K can be any integer one or greater) during TTI(n), at step 712. Each of the K transport channels is then processed, one at a time starting with the first transport channel by setting k=1, at step 714.

For transport channel TrCH(k), all transport formats (i.e., TF(i), where i=1, 2, . . . $N_k$, and $N_k$ can be any integer one or greater) available for use for the transport channel are initially determined, at step 716. A determination is then made whether any transport block in transport channel TrCH(k) was received in error for TTI(n), at step 718. This can be achieved, for example, by performing the CRC parity check on each received transport block.

In an embodiment, if any transport block in transport channel TrCH(k) was received in error in TTI(n), then the entire transmission for transport channel TrCH(k) during the TTI is deemed to have been transmitted with insufficient transmit power. Thus, if any transport block in transport channel TrCH(k) in TTI(n) was received in error, as determined in block 720, then the target SNIR, $SNIR_{TCk,TFi}$, for each transport format actually used in TTI(n) is increased by that transport format's upward adjustment, $\Delta UP_{TCk,TFi}$, at step 722. The transport formats actually used in TTI(n) can be ascertained based on the TFCI sent on the downlink DPCH or by "blind detection" (e.g., as described in Document No. 3GPP TS 25.212, which is incorporated herein by reference). The upward adjustment of the target SNIR for each transport format in TTI(n) can be achieve as follows:

$$SNIR_{TCk,TFi}(n+1)=SNIR_{TCk,TFi}(n)+\Delta UP_{TCk,TFi}(dB). \quad \text{Eq (1)}$$

Step 722 is performed for all transport channels used in TTI(n). (All available transport channels are assumed to be used in each TTI. If nothing was sent on a transport channel, then the transport format for that transport channel is {0 block size, 0 blocks}.)

In an embodiment, if all transport blocks in transport channel TrCH(k) in TTI(n) were received correctly with transport format TF(i), and if transport format TF(i) has a target SINR equal to $SNIR_{ref}(n)$, then its SNIR target, $SNIR_{TCk,TFi}(n)$, is decreased by the down step size $\Delta DN_{TCk,TFi}$. The target SNIRs of the other transport channels are not reduced since they are lower than $SNIR_{ref}(n)$ and were not selected for use by the inner loop. In general, the target SNIR adjustment performed at the terminal should be complementary to the specific scheme used to select the target SNIR for the inner loop.

For each transport format TF(i) actually used in TTI(n), a determination is then made whether or not that transport format's target SNIR, $SNIR_{TCk,TFi}(n)$ is equal to $SNIR_{ref}(n)$, at step 734. If the answer is yes, then that transport format's target SNIR is adjusted downward, at step 738, as follows:

$$SNIR_{TCk,TFi}(n+1) = SNIR_{TCk,TFi}(n) - \Delta DN_{TCk,TFi}(dB). \qquad \text{Eq (2)}$$

Otherwise, if the transport format's target SNIR is not equal to $SNIR_{ref}(n)$, then its current value is maintained, at step 736. Step 734 and either step 736 or 738 are performed for each transport format actually used in TTI(n).

After all applicable transport formats for transport channel TrCH(k) have been updated (in steps 722, 736, and 738), a determination is made whether or not all K transport channels have been processed, at step 740. If the answer is no, then the next transport channel is considered for processing by incrementing k, in step 742, and returning to step 716. Otherwise, if all K transport channels have been processed, then the reference portion target $SNIR_{ref}(n+1)$ for the next TTI(n+1) is determined, at step 744. For the first embodiment of the first power control scheme, as described in FIG. 6, the reference portion target $SNIR_{ref}(n+1)$ can be determined as the maximum target SNIR for all transport formats actually used in TTI(n). And for the second embodiment of the first power control scheme, the reference portion target $SNIR_{ref}(n+1)$ can be determined as the maximum target SNIR for all transport formats available for use for all K transport channels. This reference portion target $SNIR_{ref}(n+1)$ is then provided to the inner loop. The processing is then repeated for the next TTI(n+1) by incrementing n, at step 746

The first power control scheme described above may be applied when the TTIs of all transport channels multiplexed together on the same downlink DPCH are the same. When the TTIs of the transport channels are different from one another, then the outer loop may be modified as follows. The TTI index n would no longer be incremented per TTI, but per 10 msec frame. The target $SNIR_{TCk,TFi}$ for TF(i) of TrCH(k) would only be updated if frame n corresponded to the last frame in the TTI of TrCH(k). This is because the entire TTI of a transport channel needs to be received to determine whether a block error has occurred in one of the transport blocks. Also, the determination of whether or not the target SNIR is equal to the target $SNIR_{ref}$ is performed for each 10 msec frame, and the target SNIR can go down as long as during any one 10 msec frame the transport format is the one that limits the outer loop.

In a second power control scheme for achieving different target SNIRs for different transport formats, multiple individual outer loops are maintained for multiple transport formats, and the base station further applies different adjustments to the transmit power levels for different transport formats. As noted above, if there is a delay in the power control mechanism, then the maximum target SNIR for all available transport formats may be used for the inner loop to ensure that the proper transmit power is used for the data transmission. The use of the maximum target SNIR for the inner loop, since the specific transport format(s) to be used is not known, may unnecessarily waste power if there is a big difference between the maximum SNIR and the SNIR of the transmitted transport format. However, since the base station has knowledge of the specific transport format(s) that will be used for the upcoming TTI, it can also participate in the power control by adjusting its transmit power for the data transmission based on the actual transport format combination selected for use, ideally making all transport formats require the same reference SNIR.

In one embodiment, the base station is provided with a table of the relative difference in the target SNIR required for each transport format to achieve the target BLER. For each TTI, the base station selects one or more transport formats for use for the TTI, retrieves from the table the relative target SNIR difference for each selected transport format, and transmits at the power level determined in part by the relative target SNIR difference(s) for the selected transport format(s).

As a specific example, a particular target BLER (e.g., 1%) may be required for the FR, SID, and DTX transport formats. This may require FR frames to be transmitted at +2.5 dB over a particular reference power level, SID frames to be transmitted at +2.0 dB over the reference power level, and DTX frames to be transmitted at +0.8 dB over the reference power level. The base station may transmit a long string of DTX frames at +0.8 dB over the reference power level, and suddenly switches to the SID transport format. The base station would then automatically adjust the transmit power for this SID frame from +0.8 dB to +2 dB over the reference power level, as derived from its look-up table, without waiting for the terminal to tell it to do so via power control.

For this second power control scheme, if the terminal's inner loop is driven off of the data portion of the receive frame, or if the base station applies the power offset described above to the entire frame (i.e., the data and reference portions), then the terminal may assume that the channel conditions have changed and may try to reverse the (transport format dependent) power adjustment made by the base station. This counter action occurs because the terminal's inner loop detects that the received power has suddenly changed without it having sent any corresponding power control commands. Moreover, this counter action by the terminal would only occur if the terminal needs to process an entire received frame in order to ascertain the transport format for that received frame and, until then, would not be aware that the change in received power level was due to a new transport format, and not changes in channel conditions. Therefore, the base station may apply the power offset described above only to the data portion of the frame, and the terminal's inner loop may be driven off of only the reference portion of the receive frame. If only the transmit power of the data portion is adjusted based on transport format, then the terminal's inner loop would not detect any change in the received power in the reference portion.

As described above, the base station's (transport format dependent) power adjustment may be made only to the data portion of the transmitted frame while maintaining (i.e., do not adjust based on transport format) the transmit power level for the remaining portion of the transmitted frame that is used by the terminal to perform inner loop power control. Referring back to FIG. 4, for the downlink transmission in the W-CDMA system, the power adjustment may be applied by the base station to only the DPDCH (which carries the data portion), while the power level for the DPCCH (which carries the control or reference portion of the frame) may be maintained and not made dependent on transport format.

The transmit power for the DPDCH may thus be varied from the transmit power for the DPCCH based on a "power offset" that is dependent on transport format. The transmit power for the DPCCH (and thus the DPDCH) would be adjusted in the normal manner based on the power control commands derived from the inner loop.

As shown in FIG. 4, the DPCCH includes the pilot, TFCI, and TPC fields. If only the pilot is used for power control by the inner loop and since the DPCCH is not adjusted based on transport format, then the terminal would not try to power down a sudden change in the power level for the DPDCH. The transmit power for the DPCCH is thus used as the reference power level, and the transmit power for the DPDCH may be adjusted relative to the reference power level for the DPCCH depending on the specific transport format(s) used for the DPDCH. At the terminal, the inner loop can be operated to keep the DPCCH at the (reference portion) target SNIR supplied by the overall outer loop, as described below.

Once the terminal ascertains the current transport format as TF(i), the corresponding target SNIR is adjusted by the outer loop, and the target SNIR for that transport format (and possibly other transport formats) is used to derive the reference portion target SNIR that is then used to drive the inner loop for the next TTI. This then reduces (or possibly eliminates) the time and excess transmit power needed for the outer loop to re-converge on the reference portion target SNIR when the transport format is changed.

Figure 8:
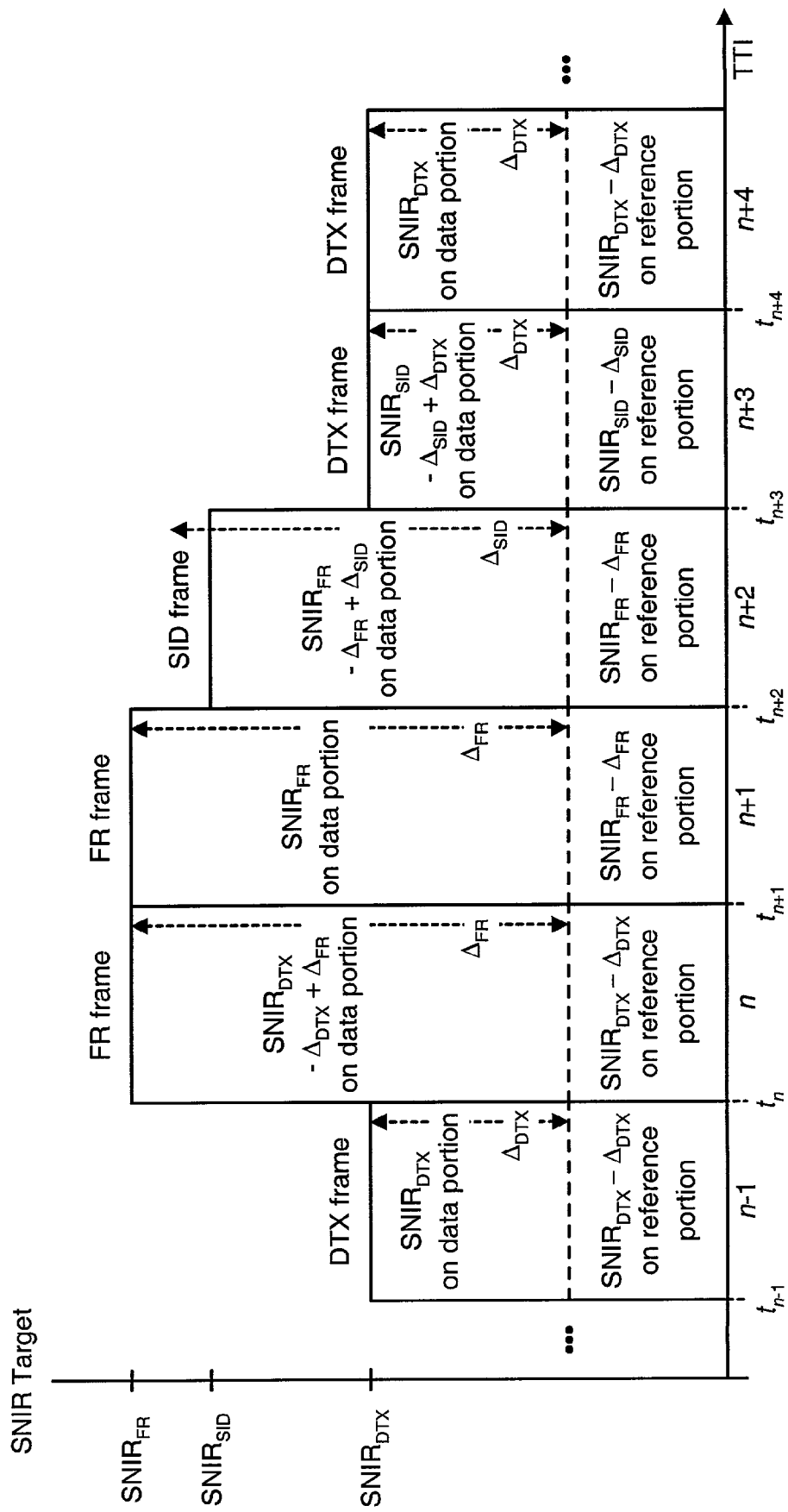
FIG. 8 illustrates a second power control scheme whereby multiple individual outer loops are maintained and transport format dependent power adjustment is made at the base station.

FIG. 8 illustrates an embodiment of a second power control scheme with multiple individual outer loops and transport format dependent power adjustment at the base station. It is assumed that the base station has knowledge of the target $SNIR_{FR}$, $SNIR_{SID}$, and $SNIR_{DTX}$ required for the terminal to achieve the target $BLER_{FR}$, $BLER_{SID}$, and $BLER_{DTX}$, respectively. These values of $SNIR_{FR}$, $SNIR_{SID}$, and $SNIR_{DTX}$ are, in general, channel-dependent and may further change over time. The techniques described herein thus apply for time-variant target SNIRs. For simplicity, the constant values are used for the target $SNIR_{FR}$, $SNIR_{SID}$, and $SNIR_{DTX}$. Techniques to derive and provide these target SNIRs are described in further detail below.

Prior to time $t_n$, a number of DTX frames have been sent by the base station with the data portions transmitted at an adjusted power level that is $\Delta DTX$ over the power level of the reference portion of the frame. The outer loop has settled on the target $SNIR_{DTX}$ required on the data portion to achieve the target $BLER_{DTX}$ for DTX frames. Since the inner loop typically operates on the reference portion of the frame, the target $SNIR_{ref}$ provided by the overall outer loop for the reference portion of the frame is $SNIR_{ref}=SNIR_{DTX,ref}=SNIR_{DTX}-\Delta_{DTX}$, and this target $SNIR_{ref}$ is used to drive the inner loop.

At time $t_n$, the base station switches to a new transport format, and a FR frame is transmitted during TTI(n), with the data portion of the frame being transmitted at an adjusted power level that is $\Delta_{FR}$ over the reference portion of the frame. During the entire TTI(n), the terminal uses the reference portion target $SNIR_{ref}$ derived from TTI(n−1) for the inner loop, which was of frame type DTX. Thus, the SNIR on the reference portion of TTI(n) will be driven to $SNIR_{DTX,ref}=SNIR_{DTX}-\Delta_{DTX}+\Delta UP$ or $\Delta DN$, and the SNIR for the data portion will be at $SNIR_{DTX}-\Delta_{DTX}+\Delta_{FR}+\Delta UP$ or $\Delta DN$. This data portion SNIR may or may not be equal to the required $SNIR_{FR}$ on the data portion to achieve $BLER_{FR}$. However, since it is assumed that the base station has accurate knowledge of $SNIR_{FR}$ and $SNIR_{DTX}$ (specifically, their difference), the base station can set the difference $(\Delta_{FR}-\Delta_{DTX})$ to be precisely $(SNIR_{FR}-SNIR_{DTX})$. In that case, the data portion of TTI(n) would be driven to $SNIR_{FR}$, since $SNIR_{DTX}-\Delta_{DTX}+\Delta_{FR}=SNIR_{FR}$ when $\Delta_{FR}-\Delta_{DTX}=SNIR_{FR}-SNIR_{DTX}$.

Shortly after time $t_{n+1}$, the terminal determines that the FR transport format was used for TTI(n), and accordingly updates the inner loop target $(SNIR_{DTX}-\Delta_{DTX})$ to the new target $(SNIR_{FR}-\Delta_{FR})$ for use during the reception of TTI (n+1), based on the status of the received FR frame (e.g., good or erased) to achieve the target $BLER_{FR}$. During TTI(n+1), another FR frame is transmitted and the terminal continues to use the reference portion target $SNIR_{ref}$. In FIG. 8, $(SNIR_{DTX}-\Delta_{DTX})$ is shown as being at the same level as $(SNIR_{FR}-\Delta_{FR})$, which results from the assumption that the base station sets $\Delta_{FR}-\Delta_{DTX}=SNIR_{FR}-SNIR_{DTX}$.

At time $t_{n+2}$, the base station switches to a new transport format, and a SID frame is transmitted during TTI(n+2) at an adjusted power level that is $\Delta_{SID}$ over the reference power level. Shortly after time $t_{n+3}$, the terminal determines that the SID transport format was used for TTI(n+2) and accordingly updates the target $SNIR_{SID}$ for SID frames based on the status of the received SID frame to achieve the target $BLER_{SID}$. The reference portion target $SNIR_{ref}$ is then updated again.

At time $t_{n+3}$, the base station switches to the DTX transport format, and a DTX frame is transmitted during TTI(n+3) at the adjusted power level of $\Delta_{DTX}$ over the reference power level. Shortly after time $t_{n+4}$, the terminal determines that the DTX transport format was used for TTI(n+3) and accordingly updates the target $SNIR_{DTX}$ for DTX frames based on the status of the received DTX frame to achieve the target $BLER_{DTX}$. The reference portion target $SNIR_{ref}$ is then updated.

Figure 9:
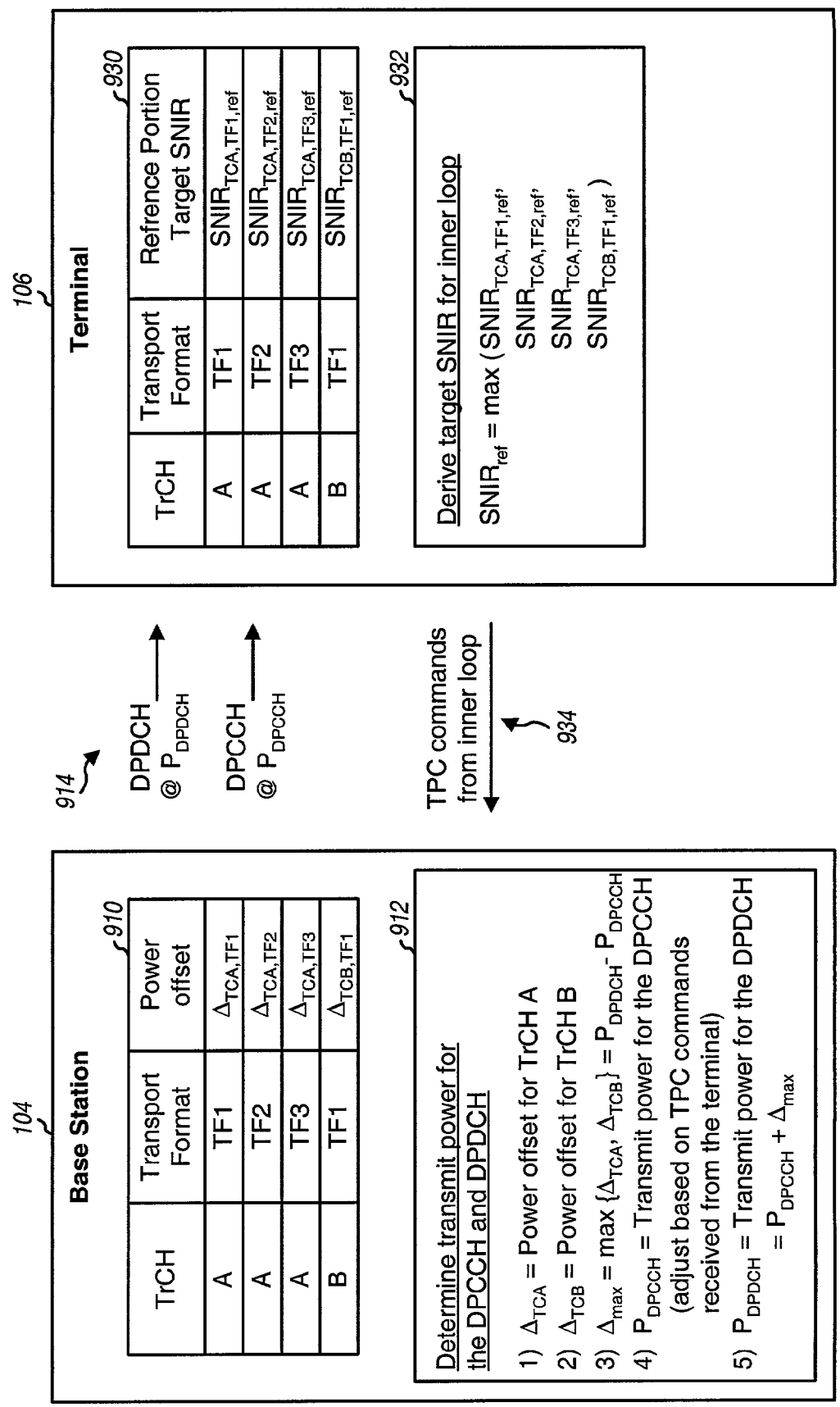
FIG. 9 is a diagram illustrating a specific implementation of the second power control scheme.

FIG. 9 is a diagram illustrating a specific implementation of the second power control scheme. At base station 104, a table 910 is maintained that lists all transport channels used for a data transmission to terminal 106 and all transport formats available for use for each transport channel. For each transport format, table 910 also lists a specific power offset, $\Delta_{TCk,TFi}$, to be applied to the data portion (e.g., the DPDCH) if that transport format is selected for use.

In W-CDMA, one or more transport channels may be multiplexed onto a coded composite transport channel (CCTrCH) that is then transmitted using a single power control mechanism. To ensure that the proper transmit power level is used for the transmitted transport formats on all transport channels multiplexed in the data transmission, a power offset may be maintained for each transport format of each transport channel. For any given TTI, the maximum of the power offsets for all transport formats selected for use for that TTI is determined, and this maximum power offset may be used for power adjustment for the data transmission for that TTI. This then ensures that each transport format in the TTI will be transmitted with sufficient power to maintain its specified target BLER.

For each TTI, the base station determines a set of quantities used to adjust the transmit power for the data transmission (step 912). These quantities include, for example:

1) the power offset to be used for the transport format selected for use in a particular TTI for each transport channel (e.g., power offsets $\Delta_{TCA}$ and $\Delta_{TCB}$ for transport channels A and B, respectively, for the example shown in FIG. 9),
2) the maximum power offset for all transport channels (e.g., $\Delta_{max}=\max\{\Delta_{TCA}, \Delta_{TCB}\}$), and
3) the transmit power to be used for the DPDCH based on the transmit power for the DPCCH and the maximum power offset (i.e., $P_{DPDCH}=P_{DPCCH}+\Delta_{max}$).

The transmit power for the DPCCH is adjusted based on the power control commands received from the terminal, which are generated by the inner loop. The DPCCH for this TTI is then transmitted at the transmit power $P_{DPCCH}$, and the DPDCH for this TTI is transmitted at the transmit power $P_{DPDCH}$ (step 914).

At terminal 106, a table 930 is maintained that lists all transport channels used for the data transmission, the available transport formats for each transport channel, and the target SNIR for the reference portion of the frame for each transport format. Each reference portion target SNIR in table 930 is associated with a respective individual outer loop maintained by the terminal for the corresponding transport format. The overall outer loop may be viewed as being comprised of the individual outer loops for all transport formats. The reference portion target SNIRs listed in table 930 are to be used to derive the inner loop setpoint for the reference portion (e.g., the DPCCH) of the receive frame.

For each TTI, the transport format for each transport channel used for the received frame is ascertained, and the status of each received transport block is also determined (e.g., good or erased). For each transport format actually used during the TTI(n), the reference portion target $SNIR_{TCk,TFi,ref}$ for the transport format is updated (i.e., adjusted either up or down, or maintained at the current level) based on a particular outer loop power control scheme, which may take into account whether or not a block error was previously received and/or the actual transmit power used on the data portion during the last TTI.

The overall outer loop provides a single reference portion target SNIR to the inner loop, $SNIR_{ref}$, and this reference portion target SNIR may be updated in each frame, since the transport channels multiplexed together may have different TTIs. For each frame, after the transport formats for all transport channels used in the current frame have been ascertained, the individual outer loops perform the necessary adjustments for those transport channels that have just finished receiving a full TTI in the last frame, and the target SNIR for the DPCCH is updated accordingly. Table 930 lists the possible reference portion target SNIRs for the DPCCH. For each transport format of each transport channel, the target SNIR for the reference portion of the frame, $SNIR_{TCk,TFi,ref}$, is related to the target SNIR for the data portion of the frame, $SNIR_{TCk,TFi,data}$, as follows:

$$SNIR_{TCk,TFi,ref} = SNIR_{TCk,TFi,data} - \Delta_{TCk,TFi}(dB), \quad \text{Eq (3)}$$

where $\Delta_{TCk,TFi}$ is the power offset used at the base station for transport format TF(i) of transport channel TrCH(k).

In actuality, the individual outer loops adjust the target $SNIR_{TCk,TFi,ref}$ for the reference portion of the frames to achieve the target BLER for the data portion, and thus the target $SNIR_{TCk,TFi,data}$ for the data portion is achieved indirectly.

Since the transport formats for the upcoming TTI are not known a priori, the target SNIR to be used by the inner loop for the DPCCH may be selected as the maximum of all reference portion target SNIRs for all available transport formats (if no information is available as to the particular transport formats to be used in the upcoming TTI). For the example shown in FIG. 9, the reference portion target SNIR for the inner loop, $SNIR_{ref}$, may be computed as:

$$SNIR_{ref} = \max\{SNIR_{TCA,TF1,ref}, SNIR_{TCA,TF2,ref}, SNIR_{TCA,TF3,ref}, SNIR_{TCB,TF1,ref}\}. \quad \text{Eq (4)}$$

If the transport format for any portion of a TTI is known (e.g., after decoding the first 10 msec frame), then the reference portion target SNIR for that transport format may be used as $SNIR_{ref}$ for the subsequent portion of the TTI. The $SNIR_{ref}$ is used for the inner loop to derive the power control commands, which are then provided to the base station (step 934). The base station may then adjust the transmit power for the DPCCH (up or down) based on the received power control commands. The transmit power for the DPDCH is also adjusted correspondingly, since it is "ganged" to the transmit power for the DPCCH by the applied power offset, $\Delta_{max}$.

The power offsets used for different transport formats may be derived and maintained in numerous ways. As described above, the goal is to set values for $\Delta_{TCk,TFi}$ and $\Delta_{TCk',TFi'}$ (for two different transport channels k and k', with different transport formats i and i') such that $(\Delta_{TCk,TFi} - \Delta_{TCk',TFi'})$ is equal to $(SNIR_{TCk,TFi} - SNIR_{TCk',TFi'})$ at the receiver. In one embodiment, fixed power offsets are used at the base station for the duration of the communication with the terminal. The values for the power offsets may be determined based on empirical measurements (in the lab or field), computer simulation, and so on. In another embodiment, the power offsets are determined at the terminal and provided to the base station.

Figure 10:
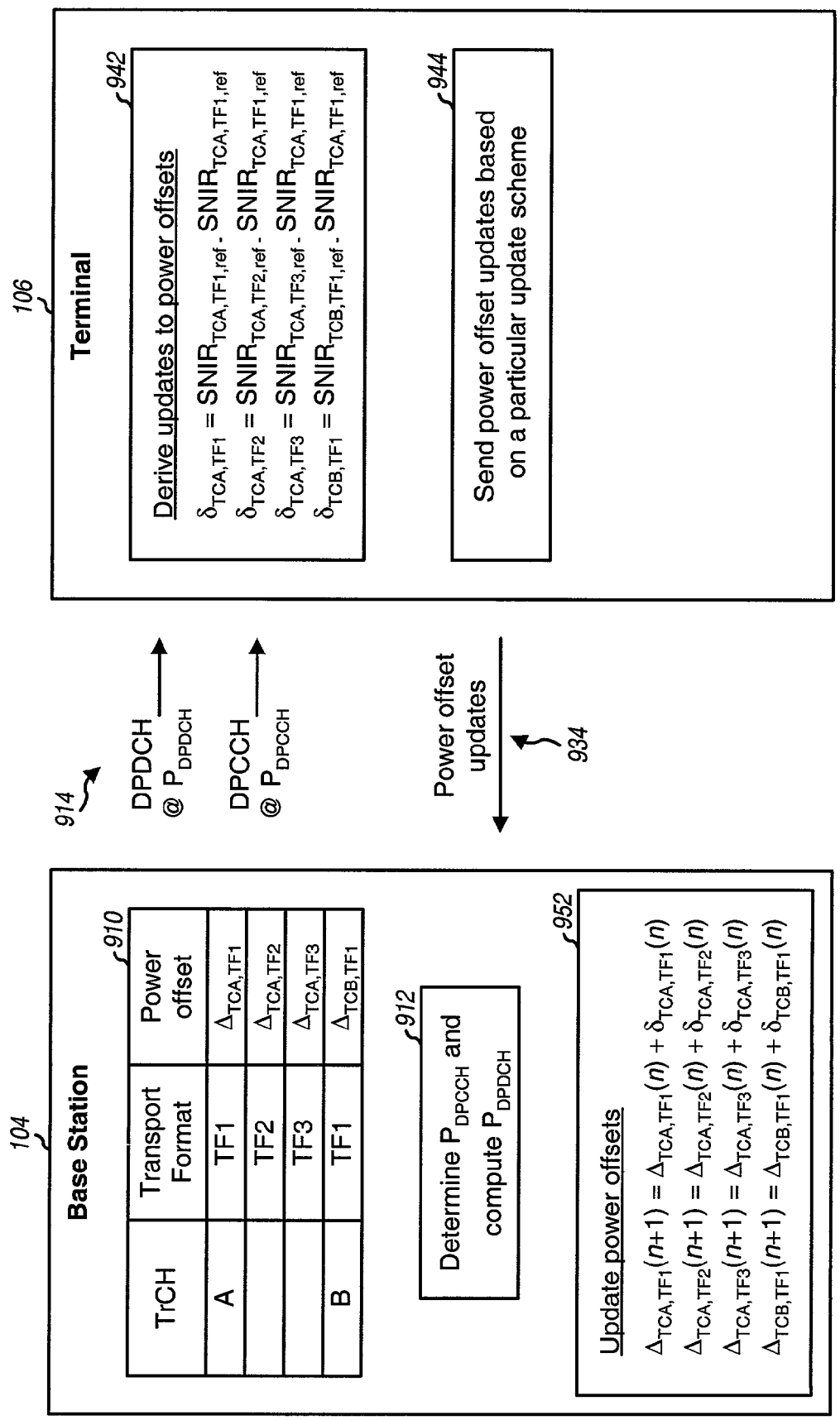
FIG. 10 is a diagram illustrating an embodiment of a third power control loop to maintain power offsets for multiple transport formats.

FIG. 10 is a diagram illustrating a specific embodiment of the third power control loop to derive the power offsets for multiple transport formats used for a data transmission. In this embodiment, the terminal maintains an individual outer loop for each transport format, and the overall outer loop is comprised of these individual outer loops, as described above. The terminal also assists in the determination of the relative differences between the reference portion target SNIRs for these transport formats and a base SNIR, which may be selected as the reference portion target SNIR for one of the transport formats. These relative differences comprise the updates to the power offsets, and are provided from the terminal to the base station. The power offset updates may be sent periodically, or only when it is determined that the channel conditions have changed sufficiently to warrant a transmission.

At base station 104, table 910 is maintained that lists all transport channels used for data transmission, the transport formats available for use for each transport format, and the power offset for each transport format. For each frame, the base station determines the transmit power for the DPCCH, $P_{DPCCH}$, and further computes the transmit power to be used for the DPDCH, $P_{DPDCH}$, based on the DPCCH transmit power, the transport formats to be used for the TTI, and the power offsets associated with these transport formats (step 912). The base station then transmits the DPCCH at the transmit power $P_{DPCCH}$, and DPDCH at the transmit power $P_{DPDCH}$ (step 914). Steps 912 and 914 are as described above.

At terminal 106, the transmitted frames are received and used to adjust the reference portion target SNIRs for the various transport formats, as described above. Updates to the power offsets may also be derived based on the reference portion target SNIRs for the transport formats and the base SNIR, which may be the reference portion target SNIR for one of the transport formats (step 942). The updated power offset, $\delta_{TCk,TFi}$, for each transport format may be computed as:

$$\delta_{TCk,TFi} = SNIR_{TCk,TFi,ref} - SNIR_{base}(dB). \quad \text{Eq (5)}$$

For the example shown in FIG. 10, the base SNIR is selected as $SNIR_{TCA,TF1,ref}$, and the power offset updates, $\delta_{TCk,TFi}$, may then be computed as:

$$\delta_{TCA,TF1} = SNIR_{TCA,TF1,ref} - SNIR_{TCA,TF1,ref},$$

$$\delta_{TCA,TF2} = SNIR_{TCA,TF2,ref} - SNIR_{TCA,TF1,ref},$$

$$\delta_{TCA,TF3} = SNIR_{TCA,TF3,ref} - SNIR_{TCA,TF1,ref}, \text{ and}$$

$$\delta_{TCB,TF1} = SNIR_{TCB,TF1,ref} - SNIR_{TCA,TF1,ref}$$

The power offset updates attempt to minimize the difference between the reference portion target SNIRs for all transport formats such that they are all approximately equal. In this way, the changes in the reference portion target SNIRs applied to inner loop are small regardless of the transport formats selected for use.

Although not shown in equation (5), the power offset updates for each transport format may be filtered based on a particular (e.g., lowpass) filter response to obtain an averaged value. In general, the time constant of the filter used for the power offset should be longer than the time constant for the outer loop.

The power offset updates may be provided from the terminal to the base station based on various update schemes (step 944). In a first update scheme, all power offset updates are provided to the base station periodically at a predetermined time interval, $t_{update}$. In a second update scheme, the power offset updates for each transport channel are provided to the base station periodically (e.g., at predetermined times selected for that transport channel) and/or as necessary. For this scheme, the power offset updates for different transport channels may be provided to the base station at different times and/or different time intervals, $t_{TCk,update}$. In a third update scheme, the power offset updates for each transport format are provided to the base station periodically (e.g., at predetermined times selected for that transport format) and/or as necessary. Again, the power offset updates for different transport formats may be provided to the base station at different times and/or different time intervals, $t_{TCk,TFi,update}$.

In a fourth update scheme, the power offset updates are provided to the base station when certain condition is satisfied. For example, the power offset updates may be provided if the maximum power offset update exceeds a particular threshold, Th. For the example shown in FIG. 10, this can be expressed as:

$$\max\{|\delta_{TCA,TF1}|, |\delta_{TCA,TF2}|, |\delta_{TCA,TF3}|, |\delta_{TCB,TF1}|\} > Th.$$

In a fifth update scheme, the power offset updates for each transport format are provided to the base station when certain condition is satisfied, e.g., if the power offset updates for the transport format exceed a threshold, $Th_{TFi}$, that is specific to that transport format. This can be expressed as:

$$|\delta_{TCk,TFi}| > Th_{TFi}.$$

Various other update schemes may also be implemented and are within the scope of the invention.

The base station receives the power offset updates from the terminal and updates its table of power offsets. The power offset for each transport format of each transport channel may be updated as follows:

$$\Delta_{TCk,TFi}(n+1) = \Delta_{TCk,TFi}(n) + \delta_{TCk,TFi}(n). \quad \text{Eq (6)}$$

The base station then uses the updated power offsets to adjust the transmit power of the DPDCH, as described above.

Correspondingly, for each transport format of each transport channel actually used during a given TTI, the terminal may update the reference portion target SNIR, $SNIR_{TCk,TFi,ref}$, for that transport format. The terminal further derives the reference portion target $SNIR_{ref}$ for the inner loop based on updated reference portion target SNIRs, which may be computed as shown in equation (4) based on the reference portion target SNIR for one or more transport formats (e.g., all available transport formats, only the transport formats used in the previous TTI, or some other set of transport formats).

Referring back to FIG. 5, the third loop 530 may be implemented between the terminal and base station. At the terminal, the base SNIR and the reference portion target SNIRs, $SNIR_{TCk,TFi,ref}$, for the transport formats are used to derive updates for the power offsets (block 526). Additional processing (e.g., filtering) may also be performed on the power offset updates in block 526. The power offset updates are then provided to the base station based on a particular update scheme and used by the base station to perform the transport format dependent power adjustment (block 516).

Figure 11:
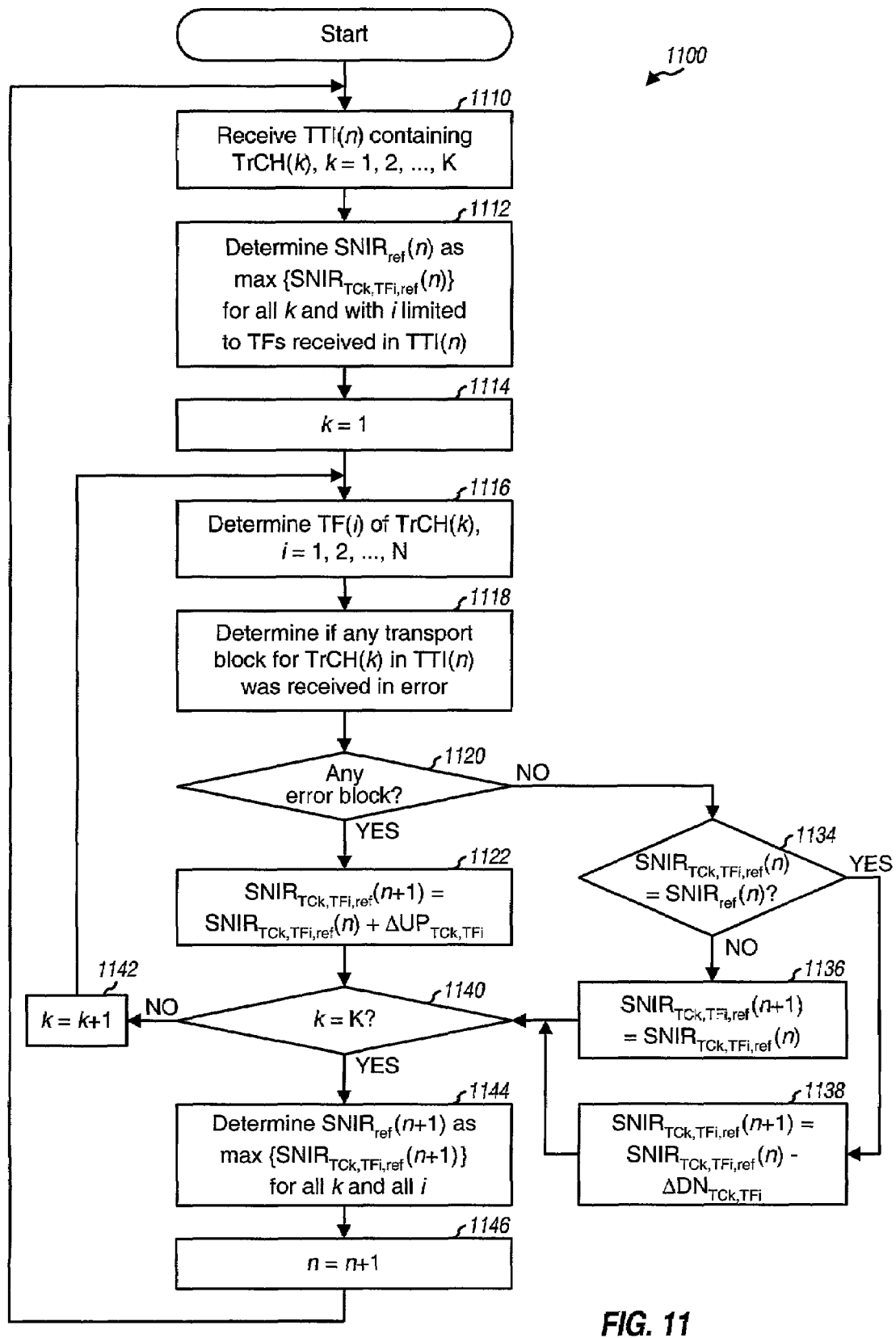
FIG. 11 is a flow diagram of an embodiment of a process performed at the terminal to maintain a number of individual outer loops for a number of transport formats based on the second power control scheme.

FIG. 11 is a flow diagram of an embodiment of a process 1100 performed at the terminal to maintain a number of individual outer loops for a number of transport formats and using transport format dependent power adjustment at the base station. Initially, the terminal receives data for K transport channels (i.e., TrCH(k) where k=1, 2, . . . K) during TTI(n), at step 1110. The terminal then determines the target $SNIR_{ref}(n)$ to be used on the reference portion during frame n, which may be determined with any available knowledge of the transport format combination of frame n at step 1112. Each of the K transport channels is then processed, one at a time starting with the first transport channel by setting k=1, at step 1114.

For transport channel TrCH(k), all transport formats (i.e., TF(i), where i=1, 2, . . . N) available for use for the transport channel are initially determined, at step 1116. A determination is then made whether any transport in block transport channel TrCH(k) was received in error for TTI(n), at step 1118. This can be achieved by performing the CRC parity check on each received transport block.

In an embodiment, if any transport block in transport channel TrCH(k) is received in error in TTI(n), then the entire transmission (i.e., all transport formats) during the TTI is deemed to have been transmitted with insufficient transmit power. Thus, if any transport block in transport channel TrCH(k) in TTI(n) was received in error, as determined in block 1120, then the reference portion target SNIR, $SNIR_{TCk,TFi,ref}$, for each transport format actually used during TTI(n) is increased by that transport format's upward adjustment, $\Delta UP_{TCk,TFi}$, at step 1122. The upward adjustment of the target SNIR for each transport format in TTI(n) can be achieve as follows:

$$SNIR_{TCk,TFi,ref}(n+1) = SNIR_{TCk,TFi,ref}(n) + \Delta UP_{TCk,TFi} \text{ (dB)}. \quad \text{Eq (7)}$$

In an embodiment, if all transport blocks in transport channel TrCH(k) in TTI(n) were received correctly, then only the reference portion target SNIR that was equal to the target $SNIR_{ref}(n)$ of the received frame is adjusted downwards by $\Delta DN_{TCk,TFi}$. If the base station determines the transmit power for the data transmission during TTI(n) based on the largest power offset for all transport formats actually used during the TTI, as described in FIG. 9, then only the largest reference portion target SNIR of all transport formats actually used for all transport channels in TTI(n) is reduced while the reference portion target SNIRs for all other transport formats are maintained at their current levels. In general, the target SNIR adjustment performed at the terminal should be complementary to the transmit power adjustment performed at the base station.

Thus, if all transport blocks in transport channel TrCH(k) were received correctly in TTI(n), as determined in block 1120, then for each transport format actually used in TTI(n), a determination is then made whether or not that transport format's reference power level, $SNIR_{TCk,TFi,ref}$, is equal to SNIR$_{ref}$(n), at step 1134. If the answer is yes, then that transport format's target SNIR is adjusted downward, at step 1138, as follows:

$$SNIR_{TCk,TFi,ref}(n+1)=SNIR_{TCk,TFi,ref}(n)-\Delta DN_{TCk,TFi} \text{ (dB)}. \quad \text{Eq (8)}$$

Otherwise, if the transport format's reference power level is not equal to SNIR$_{ref}$(n), then its current value is maintained, at step 1136. Step 1134 and either step 1136 or 1138 are performed for each transport format actually used in during TTI(n).

After all applicable transport formats have been updated (in steps 1122, 1136, and 1138), a determination is made whether or not all K transport channels have been processed, at step 1140. If the answer is no, then the next transport channel is considered for processing by incrementing k, in step 1142, and returning to step 1116. Otherwise, if all K transport channels have been processed, then the maximum reference portion target SNIR for all transport formats available for use for all K transport channels is then determined, in step 1144, and selected as the reference portion target SNIR$_{ref}$(n+1) to be provided to the inner loop. The processing is then repeated for the next TTI(n+1) by incrementing n, at step 1146.

For the embodiment described in FIG. 11, the maximum of all transport formats possible on a transport channel is used to determine SNIR$_{ref}$(n+1). This is different from the embodiment shown in FIG. 8 in which the radio frame carried only one transport channel, and only the current transport format received in frame n is used to determine SNIR$_{ref}$(n+1). These and other embodiments are within the scope of the invention.

The (transport format dependent) power adjustment by the base station based on the power offsets for the transport formats selected for use may also be implemented independently, i.e., without operating multiple individual outer loops for the transport formats. The power adjustment may be made to the data portion (e.g., the DPDCH) of each transmitted frame and the reference portion (e.g., the DPCCH or the pilot) of the transmitted frame may be maintained. A single (e.g., conventional) outer loop may be maintained to adjust the transmit power for the reference portion, which would correspondingly adjust the transmit power for the data portion.

Another aspect of the invention provides a mechanism to more accurately report the actual BLER. In an embodiment, the measured BLER used by the terminal to set the outer loop should be calculated as (the number of received transport blocks that pass CRC, excluding zero-block transport format) divided by (the total number of transport blocks received, excluding zero-block CRCs). This is also the BLER that may be reported to the base station, if the base station asks for a measurement of the actual BLER. If the transport format combination indicator (TFCI) is received incorrectly, or if the blind transport format detection (BTFD) performed by the terminal is faulty, then the BLER may be calculated incorrectly.

In some instances, the terminal is requested to report the measured BLER to the base station. Rather than have the terminal report to the base station the BLER as calculated by the terminal, the terminal may report to the base station just the number of frames (or data blocks) received correctly, and the base station may then determine the BLER itself. Since the base station knows which transport formats were used, it could use this knowledge to accurately calculate the BLER.

Figure 12:
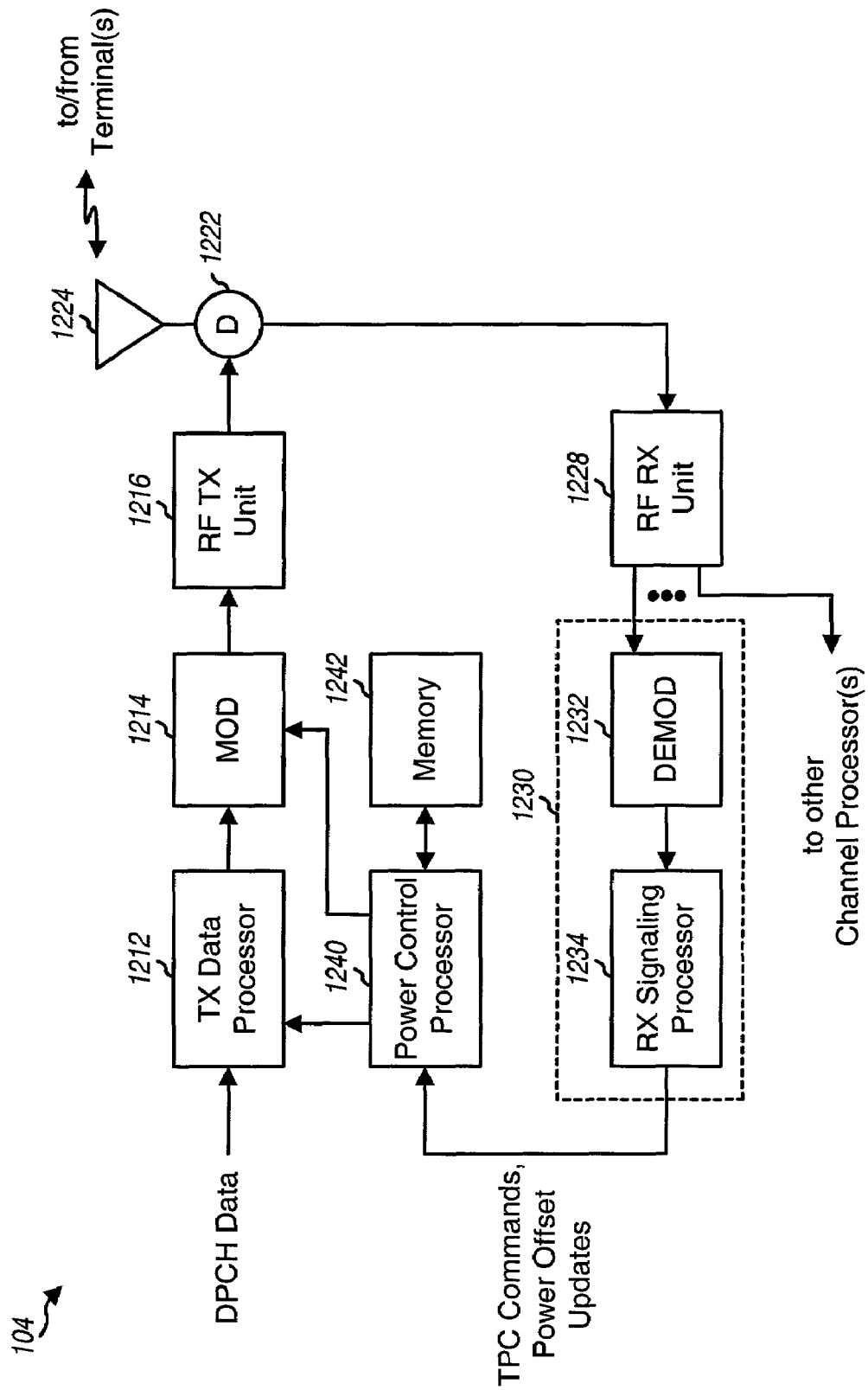
FIGS. 12 and 13 are block diagrams of an embodiment of the base station and the terminal, respectively.

FIG. 12 is a block diagram of an embodiment of base station 104, which is capable of implementing various aspects and embodiments of the invention. On the downlink, data for a particular terminal and designated for transmission on one or more transport channels of the downlink DPCH is received and processed (e.g., formatted, encoded) by a transmit (TX) data processor 1212. The processing for the downlink DPCH may be as described above in FIG. 2A, and the processing (e.g., encoding) for each transport channel may be different from that of the other transport channel. The processed data is then provided to a modulator (MOD) 1214 and further processed (e.g., channelized (or spread, in W-CDMA terminology) and further spread (or scrambled, in W-CDMA terminology)). The modulated data is then provided to an RF TX unit 1216 and conditioned (e.g., converted to one or more analog signals, amplified, filtered, and quadrature modulated) to generate a downlink modulated signal. The downlink modulated signal is routed through a duplexer (D) 1222 and transmitted via an antenna 1224 to the recipient terminal.

Figure 13:
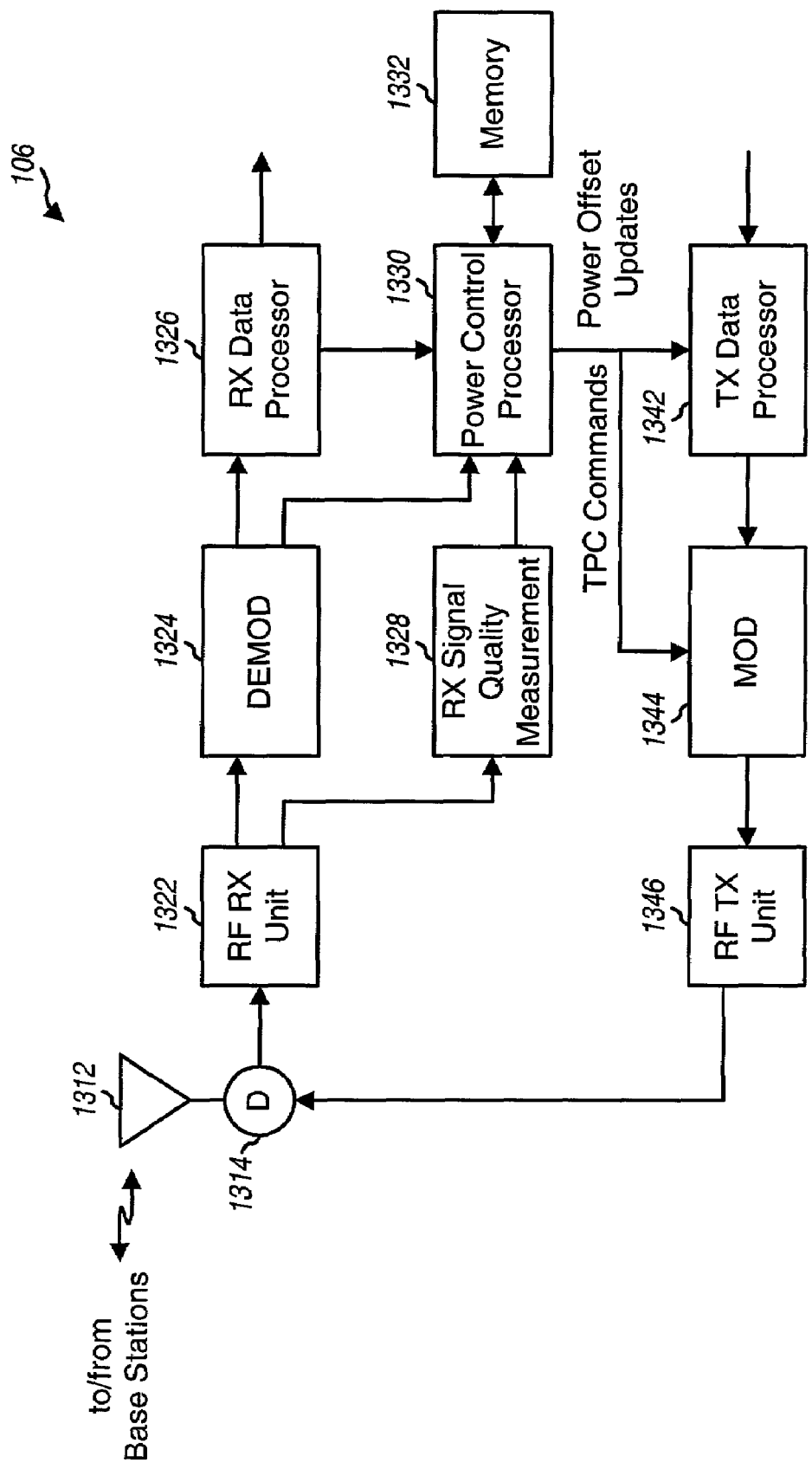

FIG. 13 is a block diagram of an embodiment of terminal 106. The downlink modulated signal is received by an antenna 1312, routed through a duplexer 1314, and provided to an RF receiver unit 1322. RF receiver unit 1322 conditions (e.g., filters, amplifies, downconverts, and digitizes) the received signal and provides samples. A demodulator 1324 receives and processes (e.g., descrambles, channelizes, and pilot demodulates) the samples to provide recovered symbols. Demodulator 1324 may implement a rake receiver that processes multiple signal instances in the received signal and generates combined recovered symbols. A receive (RX) data processor 1326 then decodes the recovered symbols for each transport channel, checks each received transport block, and provides the output data and the decoding status of each received transport block (e.g., good or erased). Demodulator 1324 and RX data processor 1326 may be operated to process a data transmission received can multiple transport channels and using multiple transport formats. The processing by demodulator 1324 and RX data processor 1326 may be as described above in FIG. 2B.

For the downlink power control, the samples from RF receiver unit 1322 may also be provided to an RX signal quality measurement unit 1328 that estimates the received SNIR of the data transmission on the downlink DPCH. The SNIR may be estimated based on the pilot included in the DPCCH and using various techniques, such as those described in U.S. Pat. Nos. 6,097,972, 5,903,554, 5,056,109, and 5,265,119.

The received SNIR estimates for the downlink DPCH are provided to a power control processor 1330, which compares the received SNIR to the target SNIR, and generates the appropriate power control information (which may be in the form of TPC commands). The power control information for the downlink DPCH is then sent back to the base station.

Power control processor 1330 also receives the status of the transport blocks (e.g., from RX data processor 1326) and one or more other metrics. For example, power control processor 1330 may receive the target BLER, the ΔUP and ΔDN, and so on, for each transport format. Power control processor 1330 then updates the target SNIRs for the transport formats based on the status of the received transport blocks and their target BLERs, and computes the reference portion target SNIR$_{ref}$ to be used for the inner loop for the upcoming TTI. Depending on the particular power control scheme being implemented, power control processor 1330 may further maintain a third power control loop that derives the power offset updates to be used for the transport formats.

A memory 1332 may be used to store various types of power control information such as the target SNIRs for the transport formats and the power offset updates.

On the uplink, data is processed (e.g., formatted, encoded) by a transmit (TX) data processor 1342, further processed (e.g., channelized, scrambled) by a modulator (MOD) 1344, and conditioned (e.g., converted to analog signals, amplified, filtered, and quadrature modulated) by an RF TX unit 1346 to generate an uplink modulated signal. The power control information (e.g., TPC commands, power offset updates, and so on) from power control processor 1330 may be multiplexed with the processed data within modulator 1344. The uplink modulated signal is routed through duplexer 1314 and transmitted via antenna 1312 to one or more base stations 104.

Referring back to FIG. 12, at the base station, the uplink modulated signal is received by antenna 1224, routed through duplexer 1222, and provided to an RF receiver unit 1228. RF receiver unit 1228 conditions (e.g., downconverts, filters, and amplifies) the received signal and provides a conditioned signal for each terminal being received. A channel processor 1230 receives and processes the conditioned signal for one terminal to recover the transmitted data and power control information. A power control processor 1240 receives the power control information (e.g., TPC commands, power offset updates, and so on, or a combination thereof) and adjusts the transmit power for the downlink DPCH. Power control processor 1240 further updates the power offsets for the transport formats based on the received power offset updates. A memory 1242 may be used to store various types of power control information such as the power offsets to be used for the various transport formats.

In FIGS. 12 and 13, power control processors 1240 and 1330 implement part of the inner and outer loops (and possibly the third loop) described above. For the inner loop, power control processor 1330 is provided with the estimated received SNR and sends back information (e.g., TPC commands) to the base station. Power control processor 1240 at the base station receives the TPC commands and accordingly adjusts the transmit power of the data transmissions on the downlink DPCH. For the outer loop, power control processor 1330 receives the transport block status from RX data processor 1326 and adjusts the target SNIRs for the proper transport formats.

The power control techniques described herein can be implemented by various means. For example, a power control mechanism can be implemented with hardware, software, or a combination thereof. For a hardware implementation, the elements used for power control can be implemented within one or more application specific integrated circuits (ASICs), digital signal processors (DSPs), digital signal processing devices (DSPDs), programmable logic devices (PLDs), controllers, micro-controllers, microprocessors, other electronic units designed to perform the functions described herein, or a combination thereof.

For a software implementation, the elements used for power control can be implemented with modules (e.g., procedures, functions, and so on) that perform the functions described herein. The software code can be stored in a memory unit (e.g., memories 1242 and 1332) and executed by a processor (e.g., power control processors 1240 and 1330). The memory unit may be implemented within the processor or external to the processor, in which case it can be communicatively coupled to the processor via various means as it known in the art.

For clarity, various aspects, embodiments, and features of the power control techniques have been described specifically for the downlink power control in W-CDMA. The techniques described herein may also be used for other communication systems (e.g., other CDMA-based systems, or power-controlled systems) in which certain attributes (e.g., rates, transport formats, of formats) of a data transmission on a particular "logic channel" (e.g., a transport channel) can results in different characteristics (e.g., different target SNIRs) for the power control mechanism. The techniques described herein may thus be used for power control of different attribute values (e.g., different rates, formats, or transport formats) of a data channel (e.g., transport channel) transmitted on a power-controlled physical channel (e.g., the downlink DPCH). The techniques described herein may also be used for the uplink power control.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for communication of data in a communication system utilizing a feedback power control scheme, the method comprising:

transmitting a first frame of data in accordance with a first transport format and at a first power level corresponding to said first transport format;

determining a need to switch transmission transport format from said first format to a second transport format;

transmitting a second frame of data in accordance with said second transport format and at a second power level corresponding to said second transport format prior to receiving a power control feedback from a receiving destination regarding transmission power level of said second frame of data;

wherein said transmitting said second frame of data occurs in a time frame immediately after a time frame used for said transmitting said first frame of data.

2. The method as recited in claim 1, further comprising: determining said second power level to be higher for a data portion of said second frame of data than said first power level for a data portion of said first frame of data.

3. The method as recited in claim 1, further comprising: determining said second power level to be the same for a reference portion of said second frame of data and said first power level for a reference portion of said first frame of data.

4. The method as recited in claim 1, further comprising: determining a data portion of said second frame of data requiring a different SNIR than a data portion of said first frame of data, thereby triggering said need to switch from said first transport format to said second transport format.

5. An apparatus for communication of data in a communication system utilizing a feedback power control scheme, the apparatus comprising:

a transmitter for transmitting a first frame of data in accordance with a first transport format and at a first power level corresponding to said first transport format;

a controller for determining a need to switch transmission transport format from said first format to a second transport format;

said transmitter further for transmitting a second frame of data in accordance with said second transport format and at a second power level corresponding to said second transport format prior to receiving a power control feedback from a receiving destination regarding transmission power level of said second frame of data;

wherein said transmitting said second frame of data occurs in a time frame immediately after a time frame used for said transmitting said first frame of data.

6. The apparatus as recited in claim 5, wherein said controller is further configured for determining said second power level to be higher for a data portion of said second frame of data that said first power level for a data portion of said first frame of data.

7. The apparatus as recited in claim 5, further, wherein said controller is further configured for determining said second power level to be the same for a reference portion of said second frame of data and said first power level for a reference portion of said first frame of data.

8. The apparatus as recited in claim 5, wherein said controller is further configured for determining a data portion of said second frame of data requiring a different SNIR than a data portion of said first frame of data, thereby triggering said need to switch from said first transport format to said second transport format.

* * * * *